(12) United States Patent
Degner et al.

(10) Patent No.: US 8,897,002 B2
(45) Date of Patent: Nov. 25, 2014

(54) INTERNAL COMPONENTS OF A PORTABLE COMPUTING DEVICE

(75) Inventors: Brett W. Degner, Menlo Park, CA (US); Christiaan A. Ligtenberg, San Carlos, CA (US); Ron A. Hopkinson, Campbell, CA (US); Patrick Kessler, San Francisco, CA (US); Bradley J. Hamel, Sunnyvale, CA (US); Dinesh C. Mathew, Fremont, CA (US); John M. Brock, San Francisco, CA (US); Keith J. Hendren, San Francisco, CA (US); Peteris K. Augenbergs, San Francisco, CA (US); Joss N. Giddings, San Francisco, CA (US); Matthew C. Waldon, San Francisco, CA (US); Cina Hazegh, San Jose, CA (US); Matthew P. Casebolt, Fremont, CA (US); Charles A. Schwalbach, Menlo Park, CA (US); Brandon S. Smith, Mountain View, CA (US); William F. Leggett, San Francisco, CA (US); Gavin J. Reid, Campbell, CA (US); Tom Tate, San Jose, CA (US); Gary Thomason, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/492,789

(22) Filed: Jun. 8, 2012

(65) Prior Publication Data
US 2013/0328741 A1    Dec. 12, 2013

(51) Int. Cl.
*H01Q 1/52* (2006.01)

(52) U.S. Cl.
USPC .................. 361/679.37; 361/679.52; 343/841

(58) Field of Classification Search
USPC ......................... 361/679.52, 679.37; 343/841
See application file for complete search history.

(56) References Cited

U.S. PATENT DOCUMENTS

2011/0091051 A1    4/2011   Thomason et al.

FOREIGN PATENT DOCUMENTS

| JP | 2002-156622 | 5/2002 |
|---|---|---|
| KR | 10-2002-0081722 | 10/2002 |
| KR | 10-2006-0132328 | 12/2006 |
| KR | 10-2009-0078530 | 7/2009 |

OTHER PUBLICATIONS

International Search Report and Written Opinion in PCT Application PCT/US2012/041769, dated Mar. 13, 2013.

*Primary Examiner* — Graham Smith
(74) *Attorney, Agent, or Firm* — Womble Carlyle Sandridge & Rice LLP

(57) ABSTRACT

The present application describes various embodiments of systems and methods for providing internal components for portable computing devices having a thin profile. More particularly, the present application describes internal components configured to fit within a relatively thin outer enclosure.

23 Claims, 29 Drawing Sheets

INTERNAL COMPONENTS OF A PORTABLE COMPUTING DEVICE

TECHNICAL FIELD

The embodiments described herein relate generally to portable computing devices. More particularly, the present embodiments relate to internal components that may be included in portable computing devices.

BACKGROUND

The outward appearance of a portable computing device, including its design and its heft, is important to a user of the portable computing device, as the outward appearance contributes to the overall impression that the user has of the portable computing device. Dimensions of the portable computing device may be particularly important to a user.

One design challenge associated with the manufacture of portable computing devices is the design of internal components as they relate to an enclosure of the portable computing device. When the design of the enclosure is selected to be relatively compact, the internal components within the enclosure must be designed and configured to fit within the compact space of the enclosure. Internal component functionality should not be compromised to because of a lack of implementation space.

Therefore, it is desirable for internal components of a portable computing device to have good functionality and to have a compact configuration to allow integration into relatively compact volumes.

SUMMARY

Embodiments of improved internal components for a portable computing device are provided. In one embodiment a touch pad includes a cover, a touch sensor, and a printed circuit board. The printed circuit board may be connected to the touch sensor and coupled to the cover at an end thereof that is free to pivot. Thereby, the printed circuit board may stiffen the end of the cover. This may facilitate use of a dome switch coupled to the printed circuit board and configured to operate upon pivoting the cover without use of a separate stiffener for the cover.

In another embodiment a display apparatus is provided. The display apparatus may include a printed circuit board, a light emitting diode, and a display driver. The display driver and the light emitting diode may be mounted to the printed circuit board. Thereby, a separate stiffener for the light emitting diode may not be required. The printed circuit board may be at least partially positioned between a light guide panel and a display panel. The display panel may be connected directly to the printed circuit board or through a flex connector.

In another embodiment an image sensor assembly is provided. The image sensor assembly can include a lens, an image sensor to receive images and a support structure that can include a well to mount the image sensor. The support structure can protect the image sensor as well as function to locate and affix the image sensor.

In another embodiment, an antenna assembly is provided. The antenna assembly can include one or more antennas disposed on a radio frequency transparent support structure. The antenna assembly can also include a metal shield, coupled to the support structure. The metal shield can perform as a ground plane for the antennas as well as an electromagnetic interference shield to reduce sensitivity of the antennas to electromagnetic emissions.

A solderable standoff is disclosed. The solderable standoff includes a metal core and a compliant outer sleeve. The metal core can include at least one solderable surface for the attachment to printed circuit boards with common soldering methods. The compliant outer sleeve can improve cosmetic appearance.

An electro-mechanical interlock is provided. The electro-mechanical interlock can couple a first printed circuit board to a second printed circuit board with a fastener. The fastener can include a flat surface that can contact a first and a second conductive surface to complete an electrical circuit when the fastener is engaged to couple the printed circuit boards together.

A compliant elastomer is provided. The compliant elastomer can be fitted to a fastener. The compliant elastomer can be used to enhance ground pathways between the fastener and any surface, such as an enclosure for a portable computing device.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Figure 1:
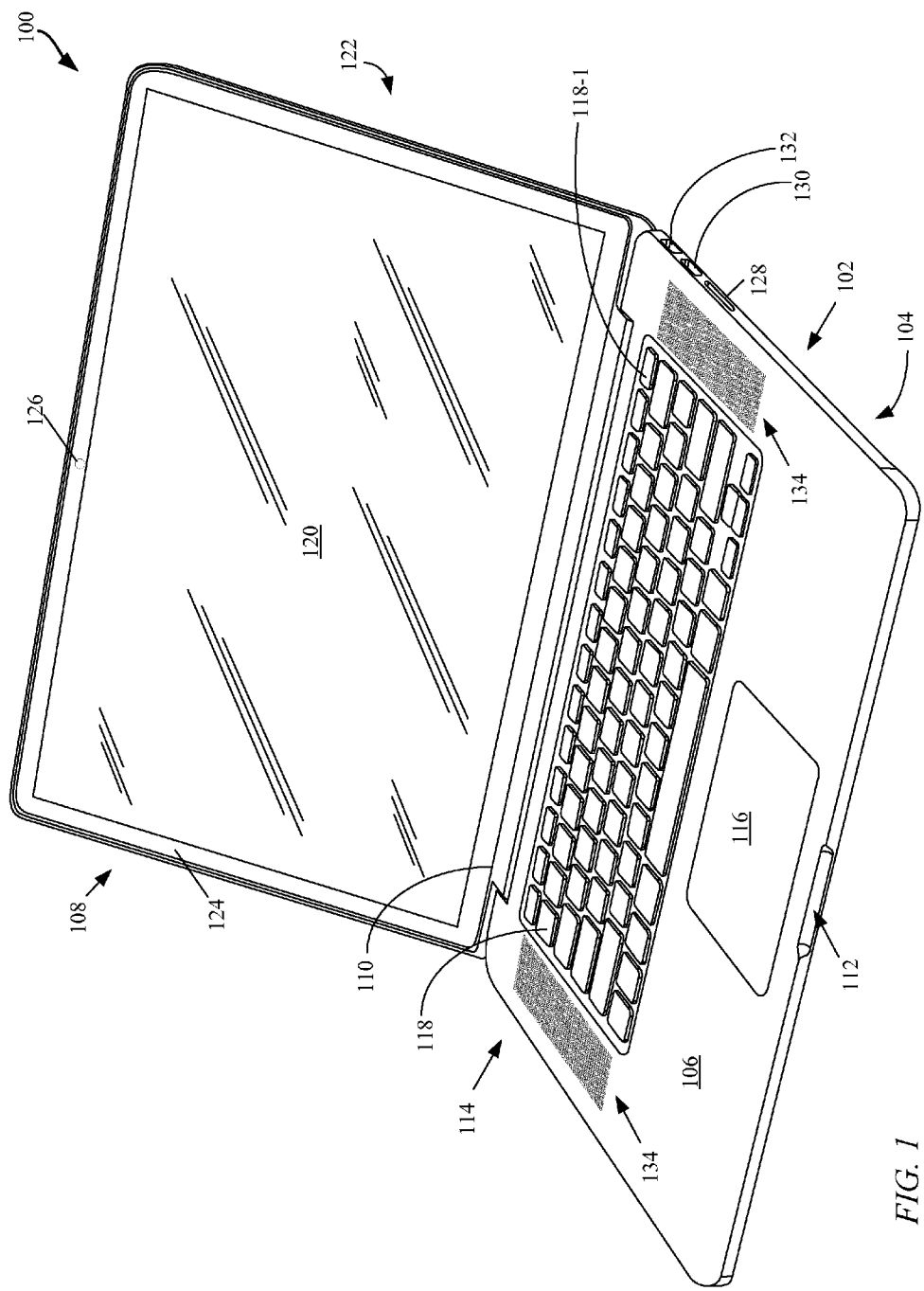
FIG. 1 shows a front facing perspective view of an embodiment of the portable computing device in the form of portable computing device in an open (lid) state according to an example embodiment of the present disclosure.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The top case and the bottom case can each be joined in a particular manner at an interface region such that the gap and offset between top and bottom cases are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The multipart housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The superior conductivity of aluminum provides a good chassis ground for internal electrical components arranged to fit and operate within the housing. The aluminum housing also provides a good electromagnetic interference (EMI) shield protecting sensitive electronic components from external electromagnetic radiation as well as reducing electromagnetic radiation emanating from the portable computing device.

The top case can include a cavity, or lumen, into which a plurality of operational components can be inserted during an assembly operation. In the described embodiment, the operational components can inserted into the lumen and attached to the top case in an "top-bottom" assembly operation in which top most components are inserted first followed by components in a top down arrangement. For example, the top case can be provided and shaped to accommodate a keyboard module. The keyboard module can include a keyboard assembly formed of a plurality of keycap assemblies and associated circuitry, such as a flexible membrane on which can be incorporated a switching matrix and protective feature plate. Therefore, following the top-bottom assembly approach, the keyboard assembly is first inserted into the top case followed by the flexible membrane and then the feature plate that is attached to the top case. Other internal components can then be inserted in a top to bottom (when viewed from the perspective of the finished product) manner.

In addition to the keyboard, the portable computing device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs. The touchpad can include circuitry for processing signals from a sensor associated with the touchpad. In one embodiment, the circuitry can be embodied as a printed circuit board (PCB). The PCB can be formed of material and placed in such a way that provides structural support for the touchpad. Thus, a separate touchpad support is eliminated.

Due at least to the strong and resilient nature of the material used to form the multipart housing; the multipart housing can include a number of openings having wide spans that do not require additional support structures. Such openings can take the form of ports that can be used to provide access to internal circuits. The ports can include, for example, data ports suitable for accommodating data cables configured for connecting external circuits. The openings can also provide access to an audio circuit, video display circuit, power input, etc.

In one embodiment, the top case can be formed from a single billet of aluminum that is machined into a desired shape and size. The top case can include an integrated support system that adds to the structural integrity of the top case. The integrated support system can be continuous in nature in that there are no gaps or breaks. The integrated support system can be used to provide support for individual components (such as a keyboard). For example, the integrated support system can take the form of ribs that can be used as a reference datum for a keyboard. The ribs can also provide additional structural support due to the added thickness of the ribs. The ribs can also be used as part of a shield that help to prevent light leaking from the keyboard as well as act as a Faraday cage that prevents leakage of extraneous electromagnetic radiation.

The continuous nature of the integrated support system can result in a more even distribution of an external load applied to the multi-part housing resulting in a reduced likelihood of warping, or bowing that reduces risk to internal components. The integrated support system can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touch pad.

These and other embodiments are discussed below with reference to FIGS. 1-29. However, those skilled in the art will readily appreciate that the detailed description given herein with respect to these figures is for explanatory purposes as the invention extends beyond these limited embodiments.

FIGS. 1-6 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotably connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on. In some embodiments, speaker grid 134 can be used to port audio from an associated audio component enclosed within base portion 102.

Figure 2:
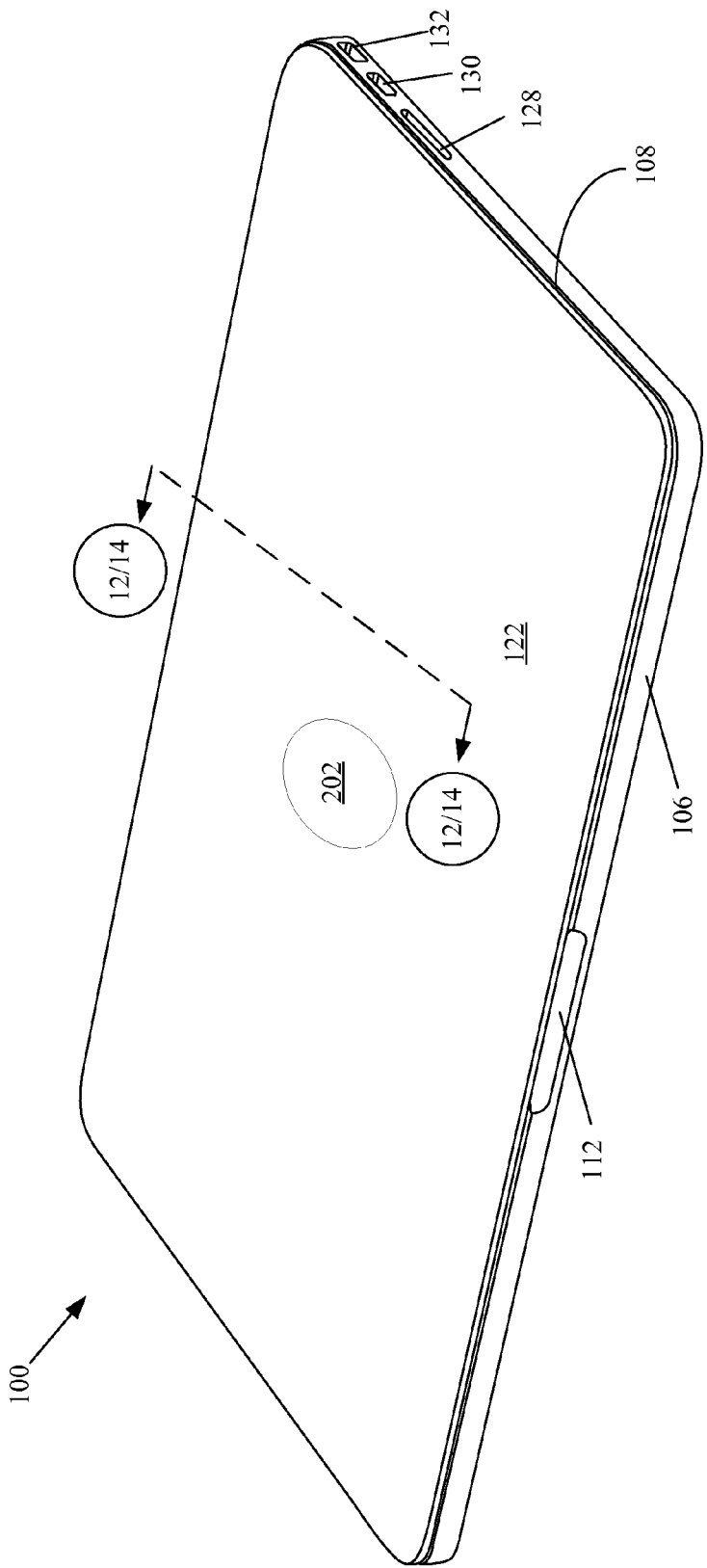
FIG. 2 shows the portable computing device of FIG. 1 in a closed (lid) configuration that shows rear cover and logo according to an example embodiment of the present disclosure.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
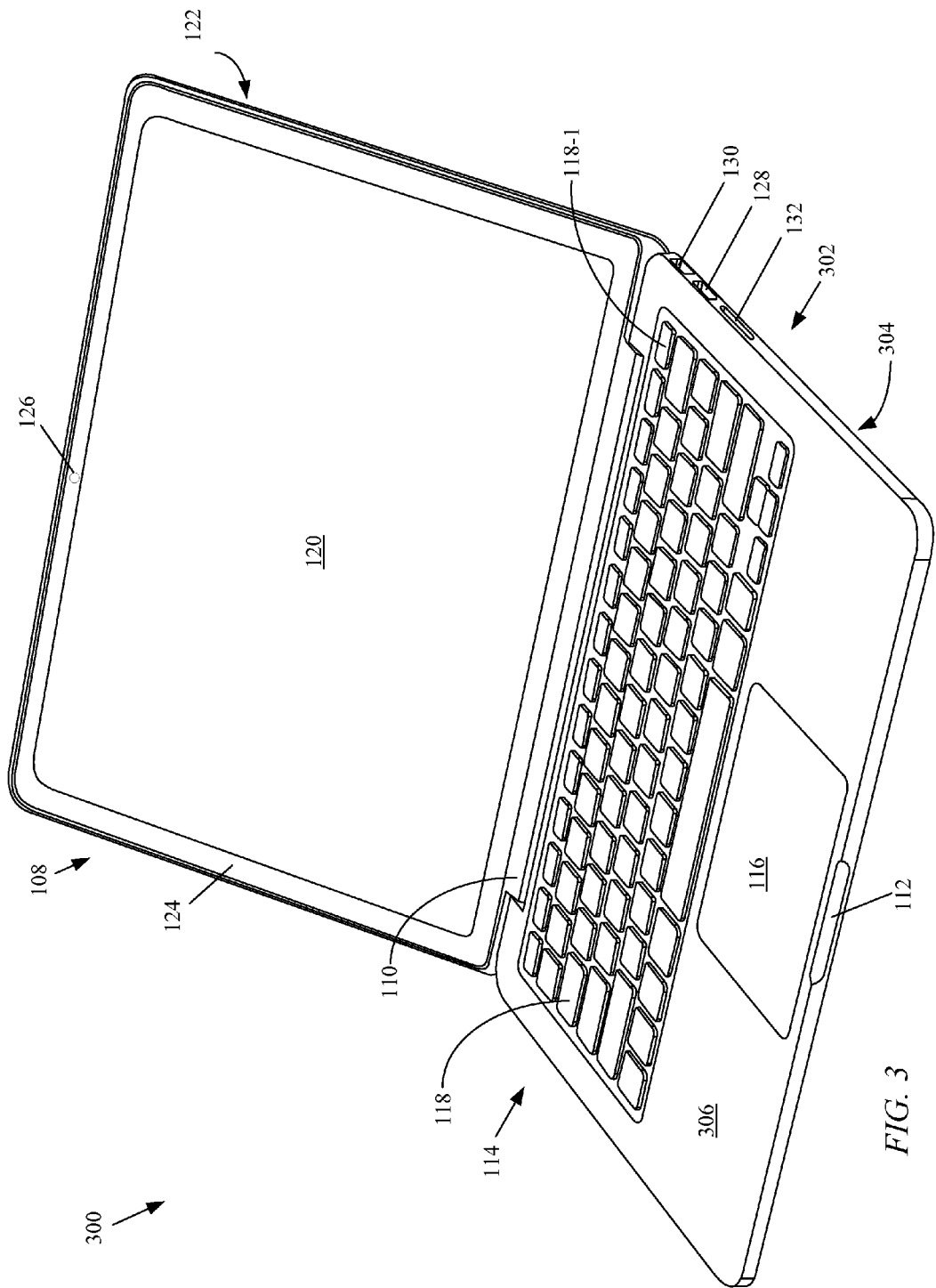
FIG. 3 shows another embodiment of the portable computing device in an open state according to an example embodiment of the present disclosure.

FIG. 3 shows another embodiment in the form of portable computing device 300 that is smaller than portable computing device 100. Since portable computing device 300 is smaller in size than portable computing device 100, certain features shown in FIG. 1 are modified, or in some cases lacking, in portable computing device 300. For example, base portion 302 can be reduced in size such that separate speakers (such as speaker grid 134) are replaced with an audio port embodied as part of keyboard 114. However, bottom case 304 and top case 306 can retain many of the features described with regards to portable computing device 100 (such as display 120 though reduced to an appropriate size).

Figure 4:
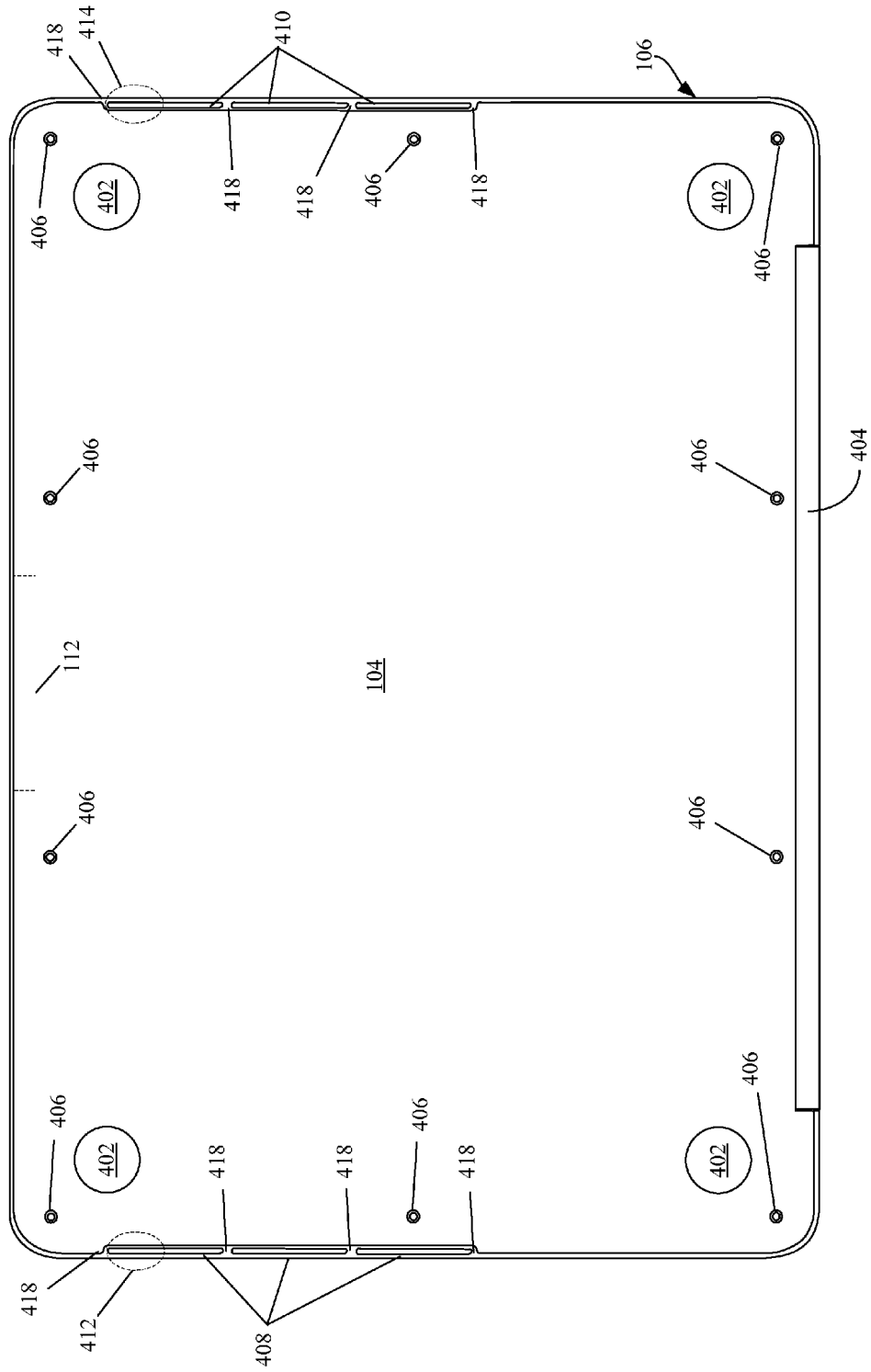
FIG. 4 shows an external view of the bottom case of the portable computing device of FIG. 1 or 3 according to an example embodiment of the present disclosure.

FIG. 4 shows an external view of bottom case 104 showing relative positioning of support feet 402, inset 112, cosmetic wall 404 that can be used to conceal clutch assembly 110 and fasteners 406 used to secure bottom case 104 and top case 106 together. Support feet 402 can be formed of wear resistant and resilient material such as plastic. Also in view are multipurpose front side sequentially placed vents 408 and 410 that can be used to provide a flow of outside air that can be used to cool internal components. In the described embodiment, vents 408 and 410 can be placed on an underside of top cover 106 in order to hide the vents from view as well as obscure the view of an interior of portable computing device 100 from the outside. Vents 408 and 410 can act as a secondary air intake subordinate to primary air intake vents located at a rear portion of portable computing device 100 (described below). In this way, vents 408 and 410 can help to maintain an adequate supply of cool air in those situations where portions of the rear vents are blocked or otherwise have their air intake restricted.

Vents 408 and 410 can also be used to output audio signals in the form of sound generated by an audio module (not shown). In one embodiment, a selected portion (such as portions 412 and 414) can be used to output sound at a selected frequency range in order to improve quality of an audio presentation by portable computing device 100. Vents 408 and 410 can be part of an integrated support system in that vents 408 and 410 can be machined from the outside and cut from the inside during fabrication of top case 106. As part of the machining of vents 408 and 410, stiffener ribs can be placed within vent openings 408 and 410 to provide additional structural support for portable computing device 100.

Moreover, trusses 418 can be formed between vents 408 and 410 in combination with stiffener ribs can add both structural support as well as assist in defining both the cadence and size of vents 408 and 410. The cadence and size of vents 408 and 410 can be used to control air flow into portable computing device 100 as well as emission of RF energy in the form of EMI from portable computing device 100. Accordingly, stiffener ribs can separate an area within vents 408 and 410 to produce an aperture sized to prevent passage of RF energy. As well known in the art, the size of an aperture can restrict the emission of RF energy having a wavelength that can be "trapped" by the aperture. In this case, the size of vents 408 and 410 is such that a substantial portion of RF energy emitted by internal components can be trapped within portable computing device 100. Furthermore, by placing vents 408 and 410 at a downward facing surface of top case 106, the aesthetics of portable computing device 100 can be enhanced since views of internal components from an external observer are eliminated.

Figure 5:
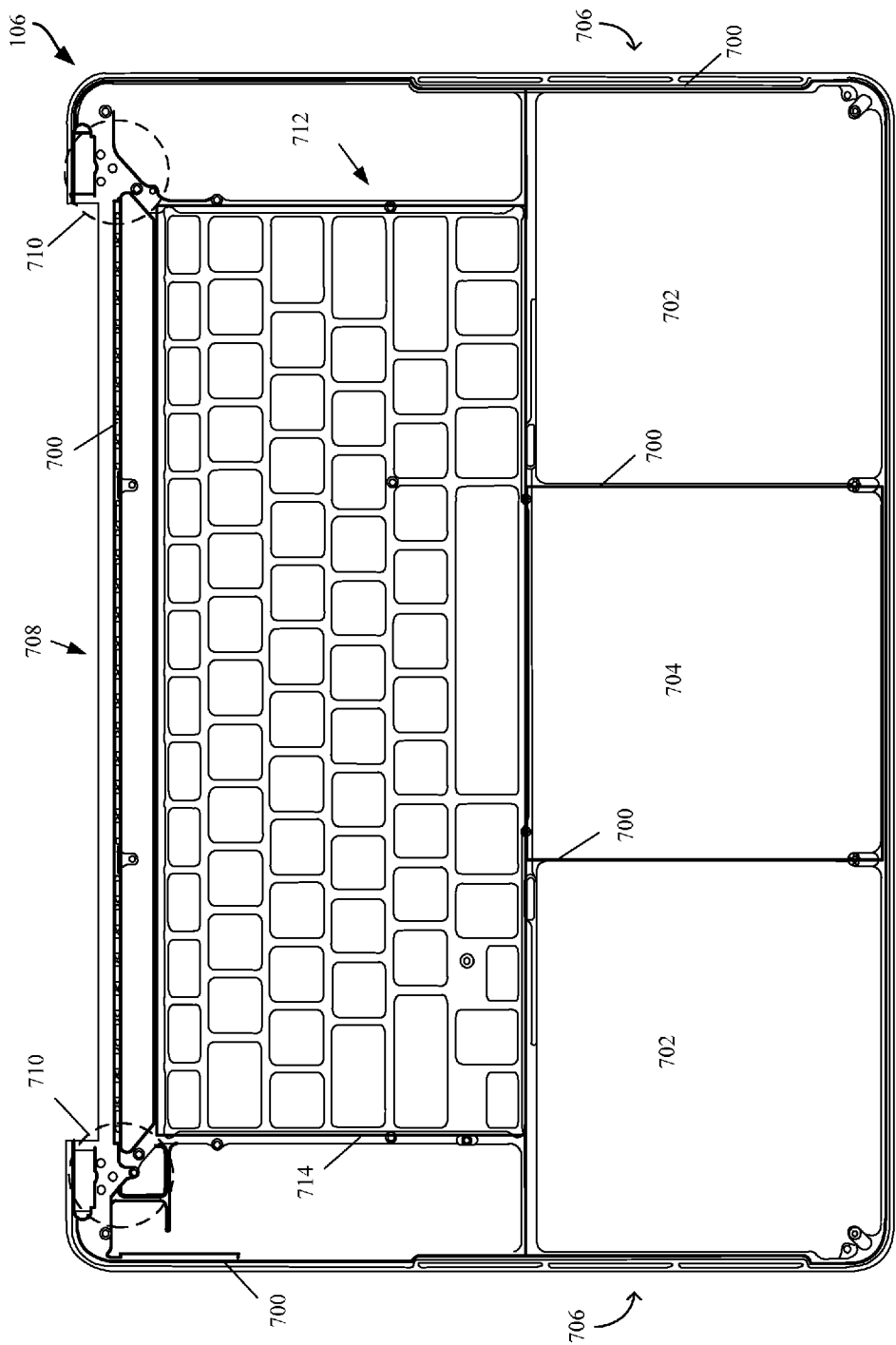
FIG. 5 illustrates a top case with an integrated support system according to an example embodiment of the present disclosure.

FIG. 5 shows integrated support system 700 in accordance with the described embodiments. In order to enhance the structural integrity, reduce bowing, and improve resistance to infrequent but potentially damaging events such as being dropped, top case 106 can be fabricated to include integrated support system 700. Generally speaking, top case 106 can be divided into various structural zones each of which can be expected to be exposed to various amounts and types of stress. For example, top case 106 can divided into palm rest zone 702, touch pad zone 704, side vents zone 706, rear vent zone 708, clutch bolt zone 710, and keyboard zone 712 that can each have individual structures that tie in together in a floor-to-ceiling arrangement to form integrated support system 700. (It should be noted that by integrated it is meant that there are substantially no breaks or gaps in the structural elements that form integrated support system 700.) For example, keyboard zone 712 can include keyboard support rib 714 that racetracks about keyboard zone 712. Keyboard support rib 714 can have an enhanced thickness "t" in order to provide a substantially increased resistance to flexing or bending (that is proportional to $t^3$). By interconnecting the various structural elements of integrated support system 700, any stress or other load applied at a particular point in a specific zone can be more evenly distributed within top case 106 thereby reducing the likelihood of bowing or warping top case 106.

Figure 6:
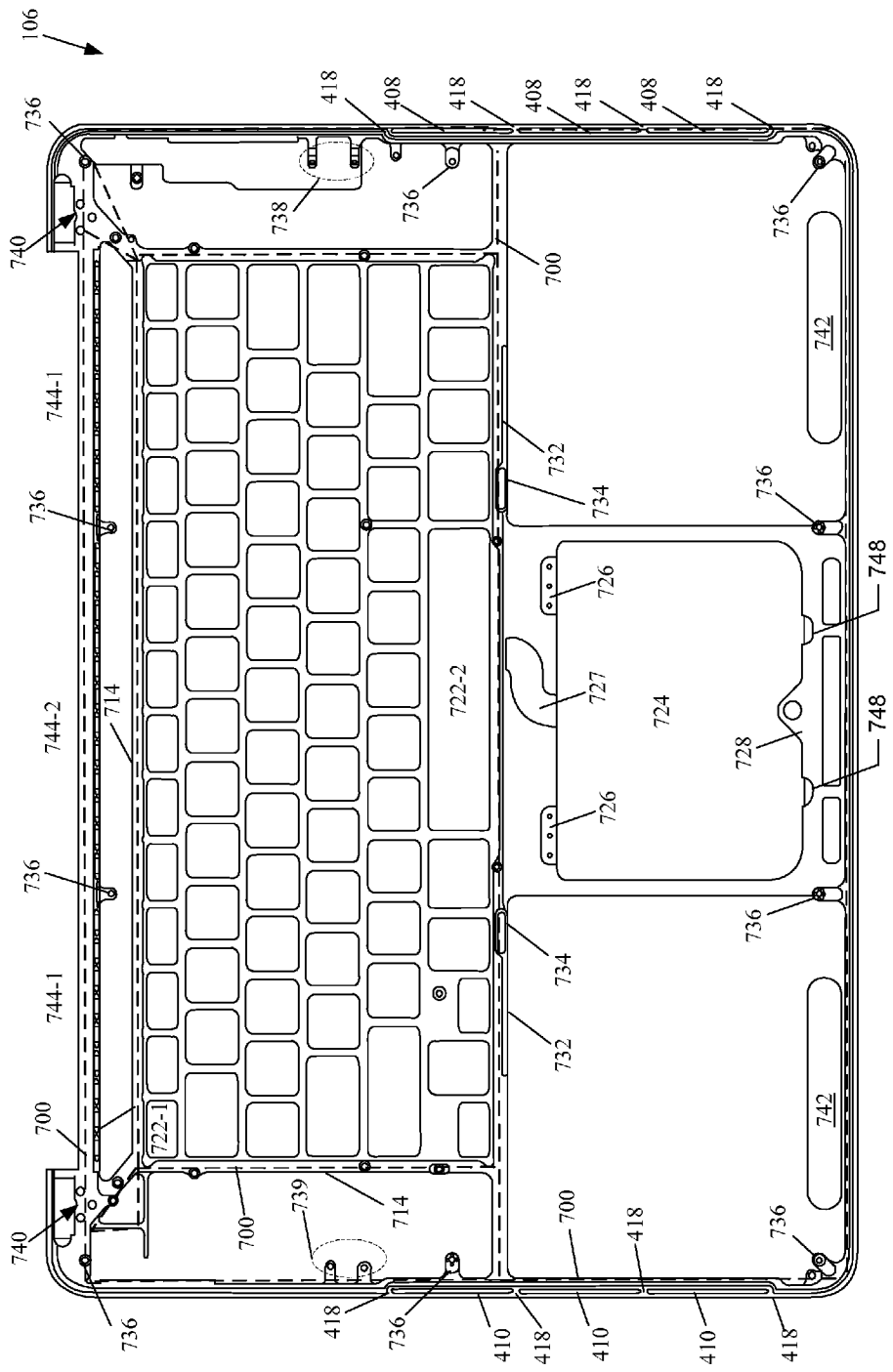
FIG. 6 illustrates a view of the top case of FIG. 5 highlighting the relationship between integrated support system and various structural components according to an example embodiment of the present disclosure.

In addition to providing stress distribution about the perimeter of top case 106, structural elements of integrated support system 700 can span top case 106 in a "crisscross" pattern obviating the problems of flexing due to what can be referred to as a "trampoline" effect, in which a central portion of top case 106 flexes more than does the edge regions (along the lines of a trampoline). In this way, portable computing device 100 can respond to physical impacts and externally applied stress as an integrated whole in contrast to conventionally configured portable computing devices where internal components are discretely attached to a housing with little or no cross support. In this way, the framing of top case 106 in the form of integrated support system 700 can flow from wall to wall and edge to edge and structural member to structural member FIG. 6 shows a view of top case 106 highlighting the relationship between integrated support system 700 and various structural components in accordance with the described embodiment. More particularly, FIG. 6 shows an interior view of top case 106 illustrating various openings used to accommodate keyboard 114 and touch pad 116. More specifically, keyboard openings 722 can each have a size and shape in accordance with an associated key cap assembly. For example, opening 722-1 can be sized to accommodate power button 118-1 whereas opening 722-2 can be sized to accommodate a space bar. In addition to keyboard openings 722, opening 724 can accommodate touch pad 116. For example, touch pad 116 can be attached directly to top case 106 at shoulders 726 and flex support 727 can be used to provide support for a flex connector. Furthermore, a dome switch associated with touch pad 116 can be supported at support plate 728.

Top case 106 can be fabricated in such a way that integrated support system 700 (as shown by the dotted line) can be used to provide support for internal components as well as a mechanism for distributing loads more evenly about top case 106 thereby avoiding localized stress points. In this way, the likelihood of warping or bowing of top case 106 can be substantially reduced. In addition to providing for load distribution, integrated support system 700 can provide support points and structures for various internal components. For example, as described above, stiffener ribs can be integrally formed with integrated support system 700 in such a way that an external load applied to portable computing device 100 in the vicinity of vents 410 (or 408) can be passed by way of stiffener ribs to integrated support system 700. In this way, the load can be transferred away from the point where the load is applied and distributed more evenly about top case 106 and bottom case 104 thereby reducing the possibility of warping or bowing.

As part of integrated support system 700, magnetic clamp supports 732 can provide a support structure for magnet pad 734 used to support magnets that magnetically attach top case 106 and bottom case 104 together that facilitates the insertion of and securing of fasteners 406 into bosses 736. For example, during an assembly operation, top case 106 and bottom case 104 are first magnetically attached to each other using magnets secured to magnet pad 734. The magnetic attraction is such that sufficient "play" in (x,y) is available for securing fasteners 406 into bosses 736 affording an easier and more timely assembly operation. Moreover, by securing top case 106 and bottom case 104 in a central region, an amount of flexion of bottom case 104 is substantially reduced thereby preventing "belly rub" where an exterior surface of bottom case 104 flexes to the point where it comes in contact with a surface upon which it rests. Other mounting features can include audio jack mounts 738, microphone mounts 739, and clutch assembly support plates 740 for securing clutch assembly 110 to top case 106.

Magnetic attachment plates 742 can be used to form a magnetic circuit with magnets disposed within lid portion 108 for securing lid portion 108 to base portion 102 in the closed configuration of portable computing device 100. Rear vent openings 744 can be used to provide air for cooling internal components such as a CPU, GPU and so forth. In one embodiment, left and right vent openings 744-1 can be used to direct exhaust air away from portable computing device 100 whereas central vent openings 744-2 can be used to direct cooler intake air into portable computing device 100. In addition to vent openings 744, vent openings 408 and 410 can be used as a secondary source of cool intake air in those situations with vent openings 744-2 are partially or fully blocked to assure adequate cooling of various internal components. Keyboard support rib 714 can be used to support a keyboard feature plate as well as part of an EMI shield used to block RF energy and a light block used to block extraneous light emanating from a light source used to illuminate key pads 118.

Figure 7:
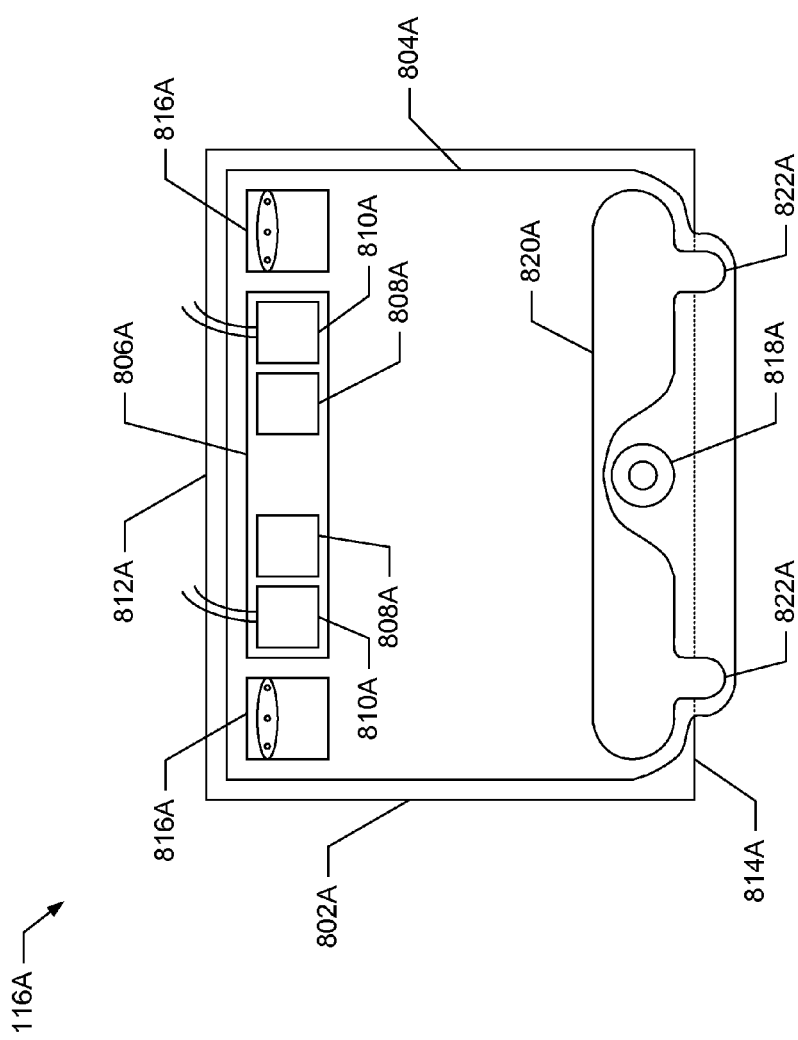
FIG. 7 illustrates a bottom view of a touch pad according to a first embodiment of the present disclosure.

Returning to the touch pad 116, a first embodiment of the touch pad 116A is illustrated in FIG. 7. As illustrated, the touch pad 116A may include a cover 802A which may define an outer surface with which a user may interact by inputting gestures thereon. The cover 802A may comprise glass in some embodiments. The gestures may be detected by a touch sensor 804A, which may be coupled to the bottom of the cover 802A, as illustrated. In some embodiments the touch sensor 804A may comprise a plastic material such polyethylene terephthalate (PET).

The touch pad 116A may also include a printed circuit board 806 including one or more touch circuits 808A and connectors 810A thereon. The touch sensor 804A may be positioned between the printed circuit board 806A and the cover 802A. The printed circuit board 806A may be in communication with the touch sensor 804A such that that the printed circuit board receives signals therefrom.

The cover 802A may extend from a first end 812A to a second end 814A. The first end 812A of the cover 802A may pivotably couple to the top case 106 of the portable computing device. In particular, mounting points 816A may be configured to couple to the shoulders 726 of the top case 106 such that the touch pad 116A is received in the opening 724 (see, e.g., FIG. 6).

Whereas the first end 812A of the cover 802A may be pivotably coupled to the top case 106, the second end 814A of the cover may be decoupled from the case. Thereby, the second end 814A of the cover 802A may pivot. In this regard, the touchpad 116A may further comprise a dome switch 818A (or other embodiment of a switch) positioned at the second end 814A of the cover 802A. The dome switch 818A may be coupled to the touch sensor 804A. Accordingly, as the second end 814A of the cover 802A pivots, the dome switch 818A may be activated. Thus, user inputs may also be inputted through the touch pad 116A through pivoting the cover 802A to actuate the dome switch 818A.

However, due to the second end 814A of the cover 802A being decoupled from the outer case 106, it may be desirable to stiffen and support the second end. In this regard, a stiffener 820A may be coupled to the second end 814A of the cover 802A, with the touch sensor 804A positioned between the stiffener and the cover. The stiffener 820A may comprise a metal such as aluminum, or other material that is relatively rigid.

The stiffener 820A may extend across the width of the cover 802A to provide the second end 814A of the cover with an added degree of stiffness. Thereby, when the second end 814A of the cover 802A is depressed, even proximate the sides thereof, the dome switch 818A may be actuated. Accordingly, the stiffener 820A may enhance the functionality of the dome switch 818A.

Figure 8:
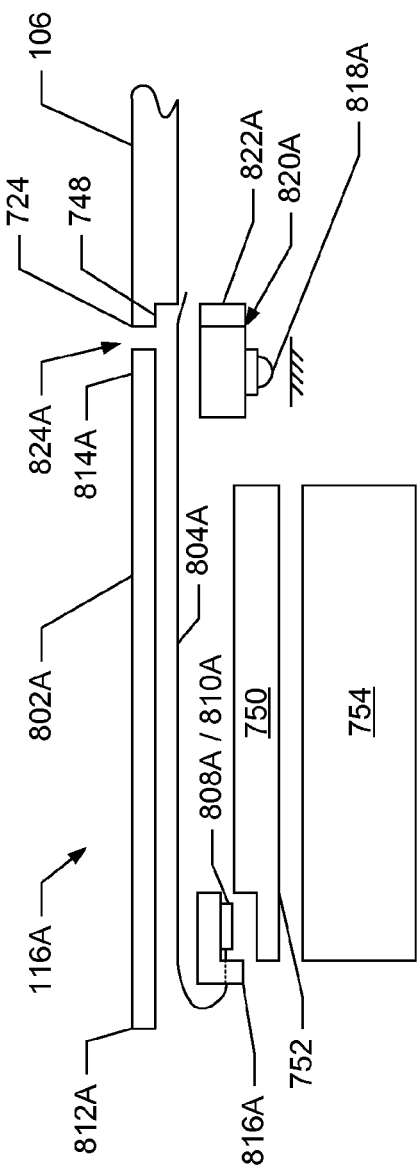
FIG. 8 schematically illustrates an exploded side view of the touch pad of FIG. 7.

Further, the stiffener 820A may comprise one or more protrusions 822A that extend past the second end 814A of the cover 802A. As illustrated in FIG. 8, which shows an exploded schematic view of the touch pad 116A, the protrusions 822A may be configured to engage recesses 748 defined in the outer case 106 proximate the opening 724 therein. Accordingly, the protrusions 822A may prevent the touch pad 116A from extending out of the opening 724 in the top case 106. As further illustrated in FIGS. 7 and 8, the touch sensor 804A may extend past the second end 814A of the cover 802A and past the protrusions 822A such that a gap 824A between the cover and the top case 106 may be concealed. In this regard, the touch sensor 804A may define a relatively dark color, such as black, which conceals the gap 824A and other components in the personal computing device 100.

As further illustrated in FIG. 8, in some embodiments a backing plate 750 may be positioned below the touch pad 116A. The backing plate 750 may be configured to define a planar surface 752 which may form a portion of a compartment in which a mass storage device 754 (e.g., a hard drive or solid state memory) is positioned. In this regard, the planar surface 752 of the backing plate 750 may abut an elastomeric material coupled to the mass storage device 754.

Figure 9:
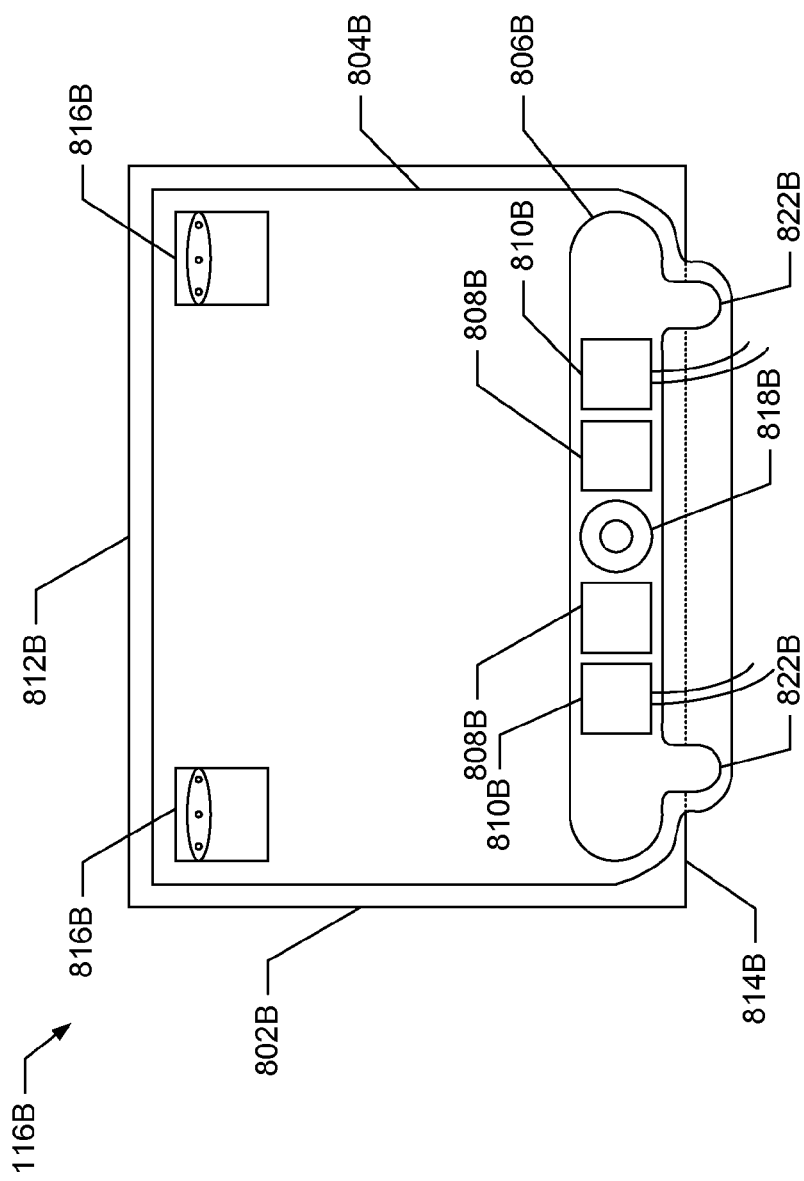
FIG. 9 illustrates a bottom view of a touch pad according to a second embodiment of the present disclosure.
Figure 10:
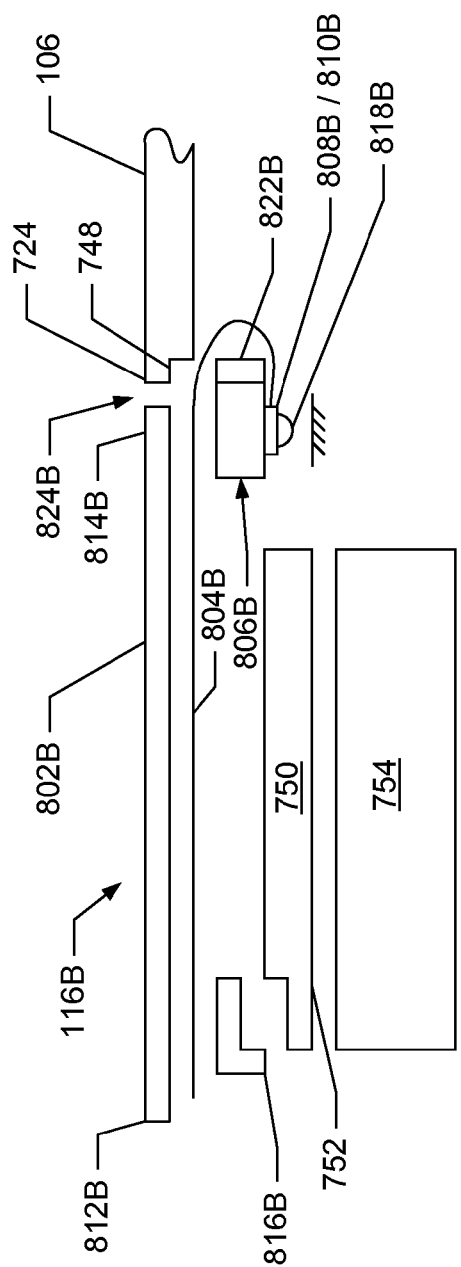
FIG. 10 schematically illustrates an exploded side view of the touch pad of FIG. 9.

FIGS. 9 and 10 illustrate an alternate embodiment of a touch pad 116B. Components of the touch pad 116B illustrated in FIGS. 9 and 10 that are similar to the components of the touch pad 116A illustrated in FIGS. 7 and 8 are referenced by similar reference numerals. For purposes of brevity, the similar components will not be described in detail.

However, the touch pad 116B includes some components which differ from the previously described embodiment. In this regard, the touch pad 116B does not include a separate stiffener. Rather, the printed circuit board 806B is repositioned from the first end 812B to the second end 814B of the cover 802B. Thus, the printed circuit board 806B itself may function as a stiffener configured to support the second end 814B of the cover 802B. In this regard, the printed circuit board 806B may also define one or more protrusions 822B that extend past the second end 814B of the cover 802B, and which are configured to engage recesses 748 in the top case 106. Further, in addition to the touch circuits 808B and connectors 810B, the dome switch 818B may be coupled to the printed circuit board 806B.

Coupling between the printed circuit board 806B and the dome switch 818B as employed in the touch pad 116B may be relatively more secure than the coupling between the dome switch 818A and the touch sensor 816A, as employed in the touch pad 116A. Also, attaching the dome switch 818B to the printed circuit board 806B may simplify assembly of the touch pad 116B. Further, by removing the need for a separate stiffener, the touchpad 116B may be simplified. Accordingly, the embodiment of the touch pad 116B illustrated in FIGS. 9 and 10 may be preferable in some embodiments.

Figure 11:
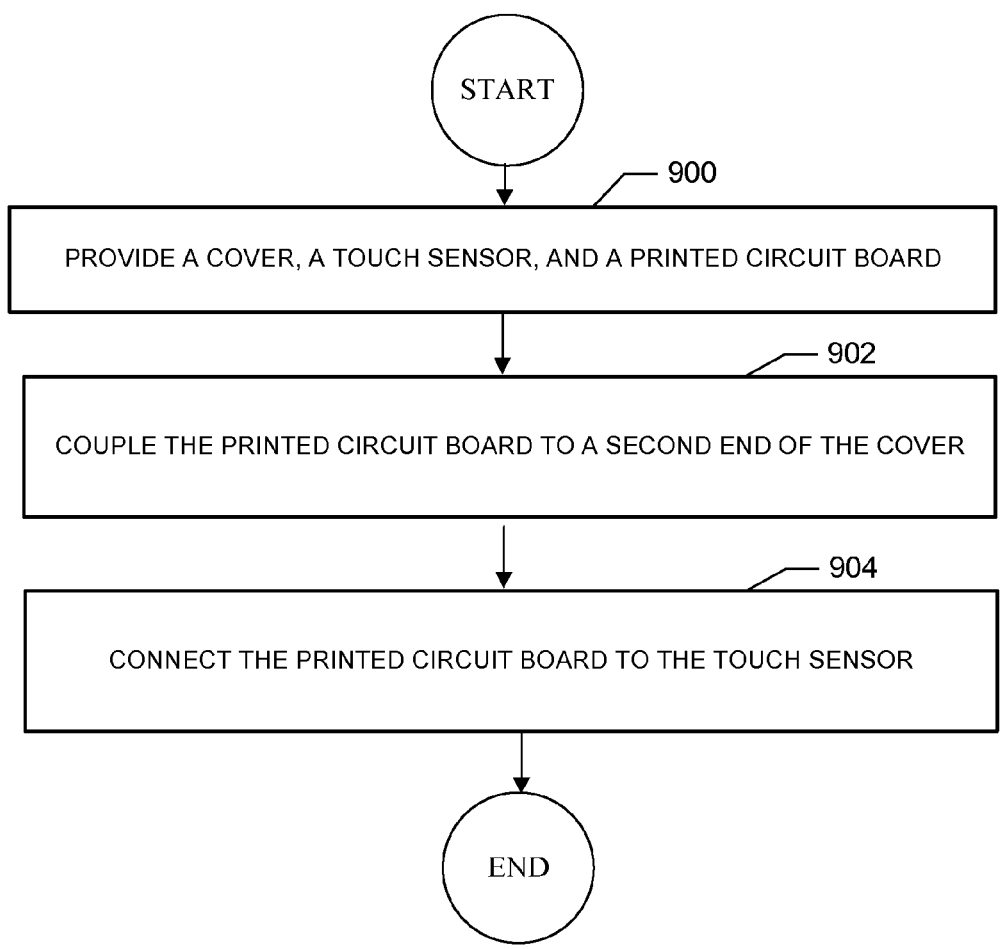
FIG. 11 schematically illustrates a method for assembling a touch pad according to an example embodiment of the present disclosure.

A related method for assembling a touch pad is also provided. As illustrated in FIG. 11, the method may include providing a cover extending from a first end to a second end, providing a touch sensor, and providing a printed circuit board at operation 900. The method may further comprise coupling the printed circuit board to the second end of the cover to support the second end of the cover at operation 902. Further, the method may include connecting the printed circuit board to the touch sensor at operation 904.

In some embodiments the method may also include pivotably coupling the first end of the cover to a case of a portable computing device with the second end decoupled from the case. Further, the method may include coupling a switch to the printed circuit board, wherein the switch is configured to actuate upon pivoting the cover about the first end. The method may also include concealing a gap between the cover and the case by extending the touch sensor past one or more protrusions defined by the printed circuit board at the first end of the cover.

Figure 12:
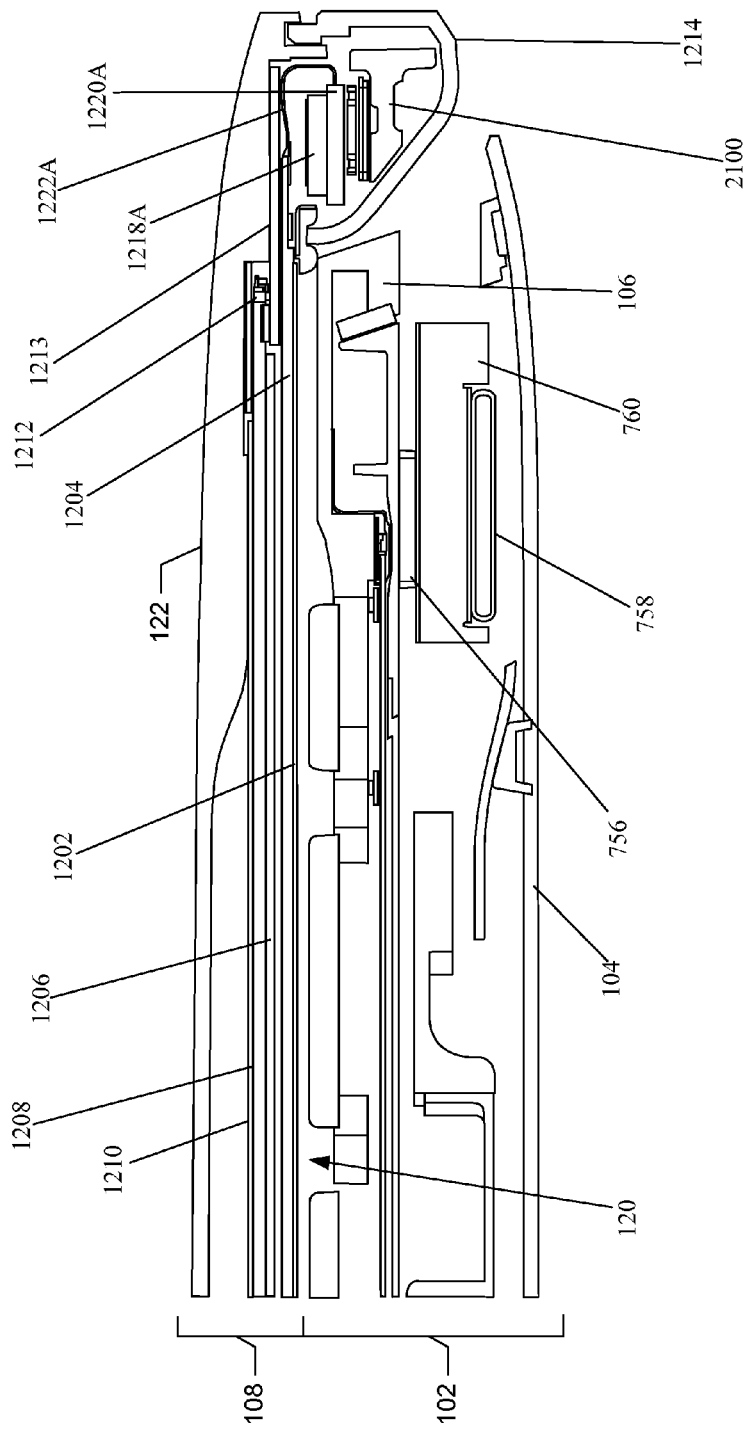
FIG. 12 illustrates a side view of internal components of the portable computing device along line 12/14-12/14 in FIG. 2 according to a first example embodiment of the present disclosure.

Turning now to the display 120, FIG. 12 illustrates a first embodiment of a view through the portable computing device along line 12/14-12/14 in FIG. 2. As illustrated, the base portion 102 may include a number of internal components positioned between the top case 106 and the bottom case 104. For example, a central processing unit 756, a heat pipe 758, and a heat exchanger 760 may be positioned therein.

Further, the lid portion 108 may include the display 120 and the rear cover 122, as described above. The display 120 may include various components including a glass panel 1202, a display panel 1204 (e.g., a thin film transistor liquid crystal display (TFT-LCD) panel), one or more films 1206 (including for example, a diffuser), a light guide panel 1208, and a light reflector 1210. A light emitting diode (LED) array 812 may illuminate the light guide panel 1208. The LED array 1212 may be mounted to a stiffener 1213, which is mounted to the rear cover 122 of the lid portion 108.

Additional internal components may be housing within a clutch cover 1214. For example, an antenna assembly 2100 may be included therein. Further, in the embodiment illustrated in FIG. 12, a driver IC 1218A mounted to, and in communication with, a printed circuit board substrate 1220A may be included in the clutch cover 1214 and connected to the display panel 1204 via a flex connector 1222A.

Figure 13:
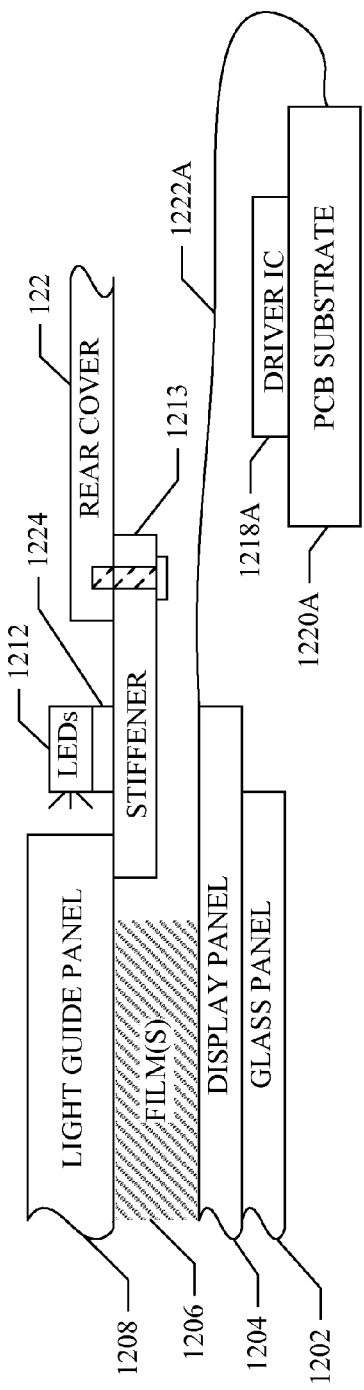
FIG. 13 schematically illustrates the internal components of FIG. 12.

Certain components related to the display 120 described above with respect to FIG. 12 are illustrated schematically in FIG. 13. As illustrated, the embodiment described above remotely locates the driver IC 1218A and the printed circuit board substrate 1220A therefore, which may thereby require use of the flex connector 1222A to connect to the display panel 1204. Further, a separate stiffener 1213 may be needed to mount the LED array 1212. Further, as illustrated in FIG. 13, a flex connector 1224 may also be required to connect power to the LED array 1212.

Figure 14:
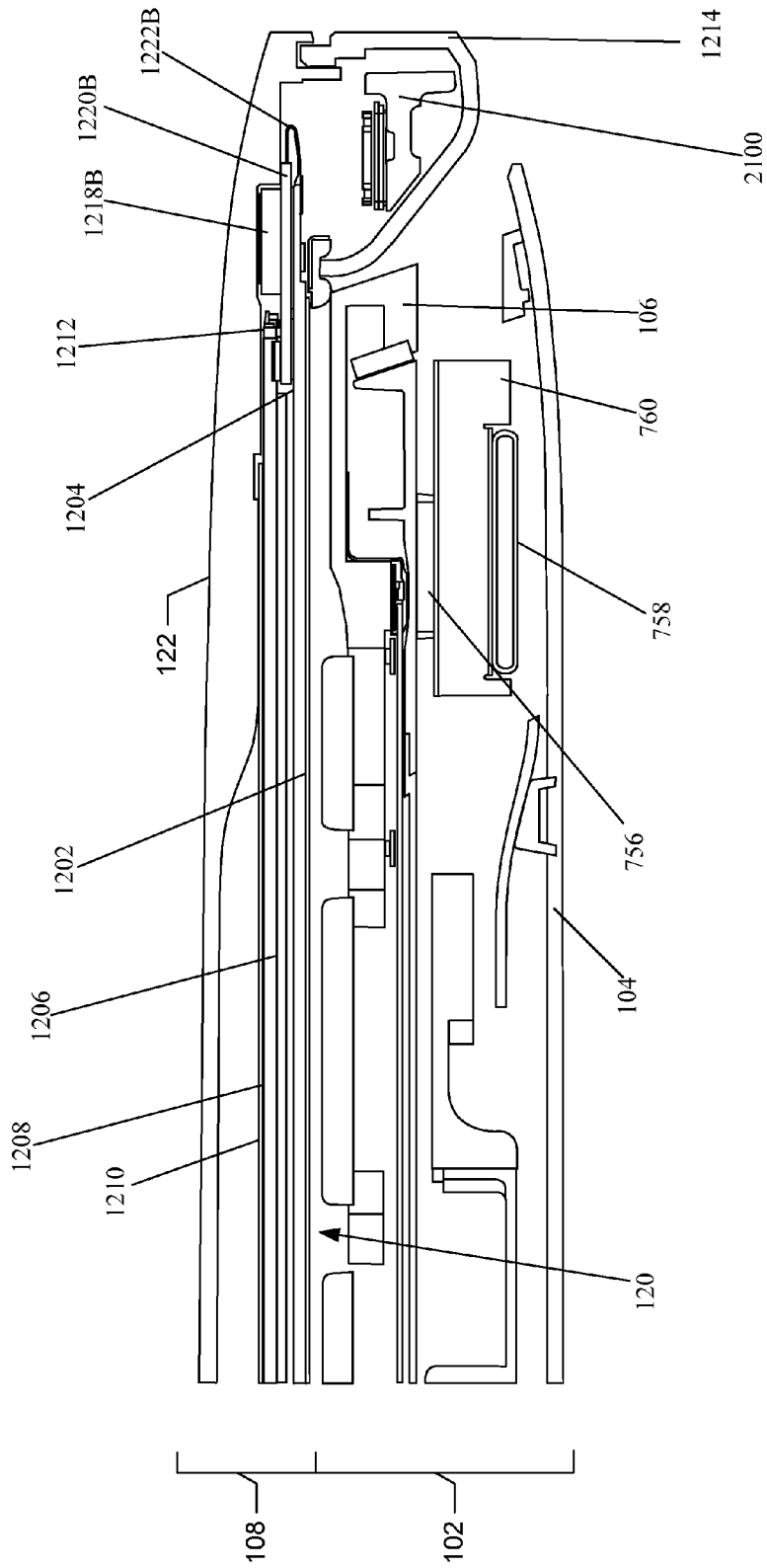
FIG. 14 illustrates a side view of internal components of the portable computing device along line 12/14-12/14 in FIG. 2 according to a second example embodiment of the present disclosure.

FIG. 14 illustrates an alternate embodiment of internal components configured to more efficiently make use of space within the personal computing device and overcome the deficiencies noted above. The components illustrated in FIG. 14 are substantially the same as the components illustrated in FIG. 12 with certain exceptions. In this regard, the driver IC 1218B, printed circuit board 1220B for the display driver, and the flex connector 1222B (which is optional, as described below) may be positioned in an alternate location, and arranged differently.

Figure 15:
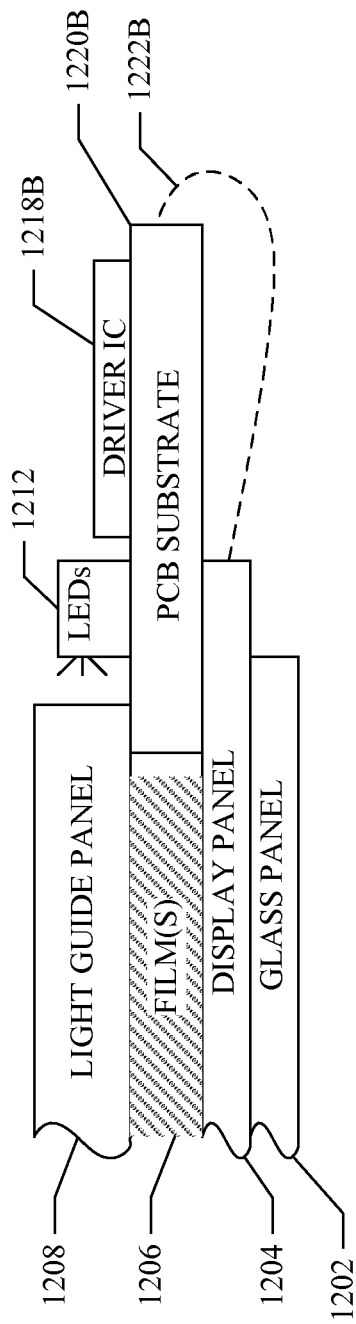
FIG. 15 schematically illustrates the internal components of FIG. 14.

More particularly, as schematically illustrated in FIG. 15, the LED array 1212 may be mounted to the printed circuit board 1220B for the driver IC 1218B and in communication therewith. Thereby, the LED array 1212 may be supported and positioned proximate an end of the light guide panel 1208. The driver IC 1218B may also be mounted to the printed circuit board 1220B and in communication therewith. Accordingly, use of a separate stiffener for the LED array 1212 may not be required. Additionally, the printed circuit board 1220B may be at least partially positioned between the light guide panel 1208 and the display panel 1204, such that the space therebetween may be efficiently employed. Thereby, the width of display 120 may be reduced at the edges thereof.

In some embodiments, the display panel 1204 may be connected to the printed circuit board 1220B by a flex connector 1222B. However, due to placing the printed circuit board 1220B against the display panel 1204, in another embodiment the display panel may be directly connected to the printed circuit board without use of the flex connector 1222B. Also, since the LED array 1212 is directly mounted to the printed circuit board 1220B, a flex connector for the LED array may not be required. Accordingly, the display 120 may also be simplified in this respect. Thus, the embodiment of the display 120 illustrated in FIGS. 14 and 15 may reduce the number of internal components in the personal computing device and more efficiently make use of the available space therein.

Figure 16:
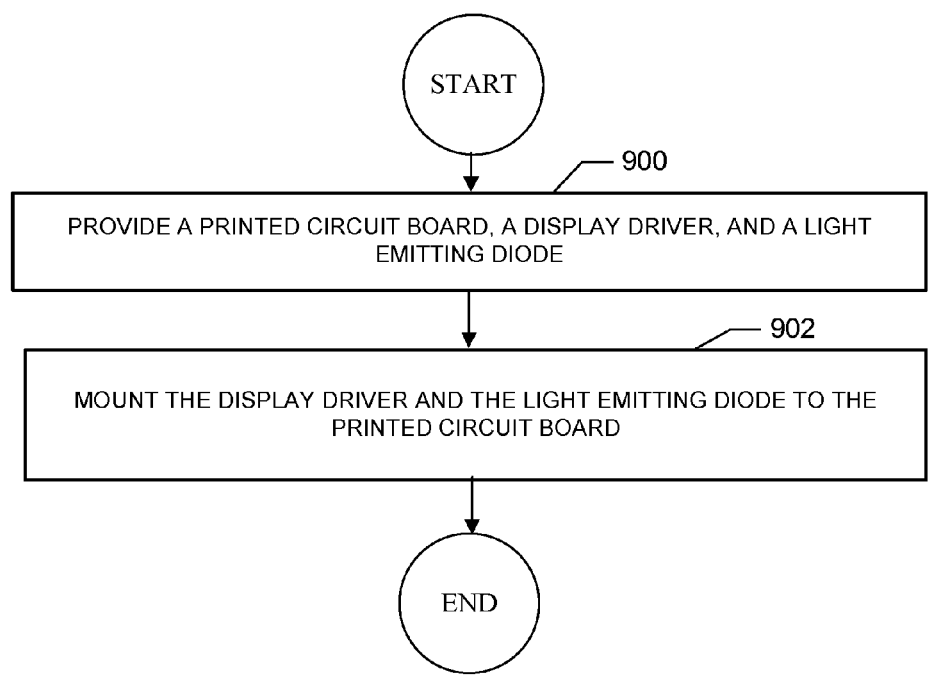
FIG. 16 schematically illustrates a method for assembling a display assembly according to an example embodiment of the present disclosure.

A related method is also provided. As illustrated in FIG. 16, the method may include providing a printed circuit board, a display driver, and a light emitting diode at operation 900. Further, the method may include mounting the display driver and the light emitting diode to the printed circuit board such that the display driver and the light emitting diode are in communication therewith at operation 902. The method may also include providing a light guide panel and a display panel, and positioning the printed circuit board at least partially between the light guide panel and the display panel. The method may additionally include connecting the display panel to the printed circuit board with a flex connector. Alternatively, the method may include directly connecting the display panel to the printed circuit board (e.g., via anisotropic conductive film (ACF) bonding). Further, the method may include positioning the light emitting diode proximate an end of the light guide panel.

In some embodiments, spacing between a PCB and another object should be maintained a predetermined distance. A traditional standoff can be used, but attaching a traditional standoff can be labor intensive and can require one or more holes to be drilled into the PCB. To ease manufacturing and reduce PCB fabrication costs, a solderable standoff can be used.

Figure 17A:
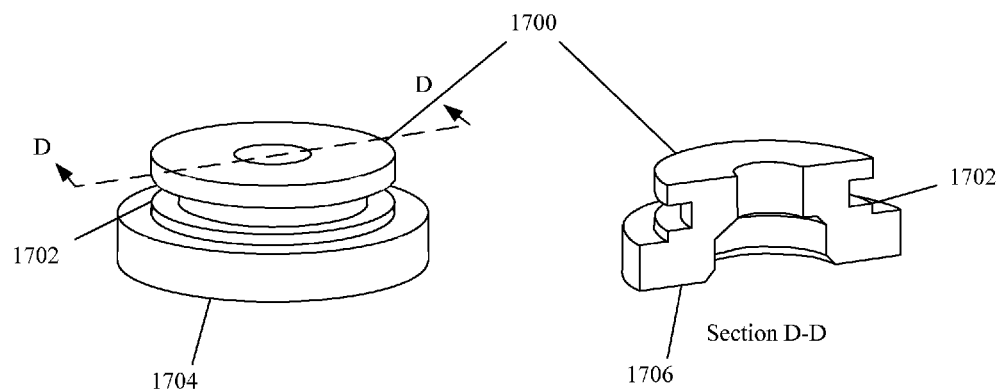
FIGS. 17A-17B are illustrations of solderable standoff, in accordance with one embodiment of the present disclosure.
Figure 17B:
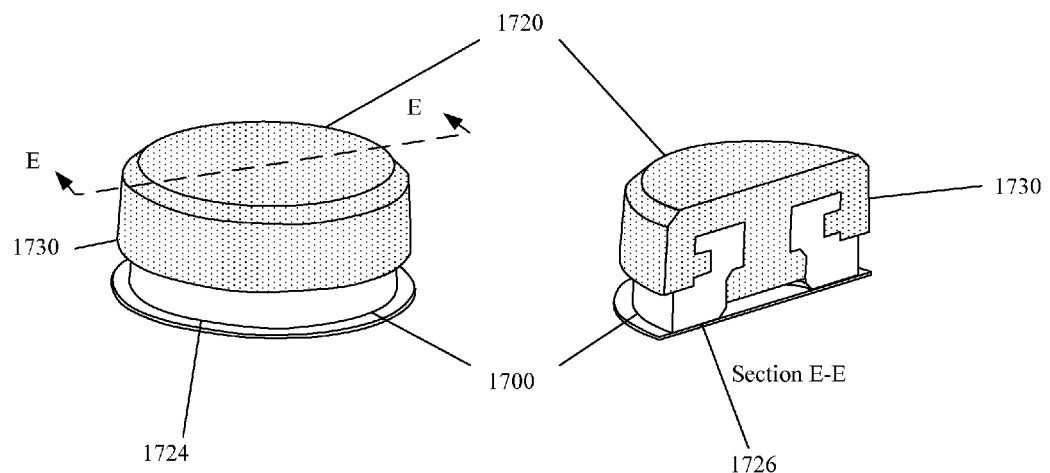

FIGS. 17A-17B are illustrations of solderable standoff, in accordance with one embodiment of the present disclosure. FIG. 17A shows metal core 1700. A full view 1704 of metal core 1700 is shown along with a cross-section 1706. Metal core 1700 can be soldered to a substrate, such as a PCB, with traditional solder processes, such as a reflow process. Metal core 1700 can include interlock features 1705 disposed along the sides to provide a locking surface. FIG. 17B shows solderable standoff 1720 including metal core 1700 and rubber cap 1730. Full view 1724 and a cross section 1726 of the solderable standoff 1720 is shown. In one embodiment, rubber cap 1730 can be pressed onto metal core 1700 and can engage interlock features 1702. In one embodiment rubber cap can be made of rubber, compression molded rubber, synthetic rubber or any other compliant material capable of withstanding exposure to temperatures related to soldering. For example, if a reflow solder temperature is about 270 degrees C., then material for rubber cap 1730 should be capable of withstanding exposure of at least 270 degrees C. Assembled standoff can be soldered to a PCB with conventional soldering methods. Typically a land pattern sized in accordance with the metal core 1700 can be provided on the PCB. Standoff 1720 can provide spacing control between a PCB and any other object such as another PCB, mechanical assembly or other component. Rubber cap 1730 can provide compliance between PCB and any other object, particularly in instances when an impulse may be applied to personal computing device 100.

Figure 18A:
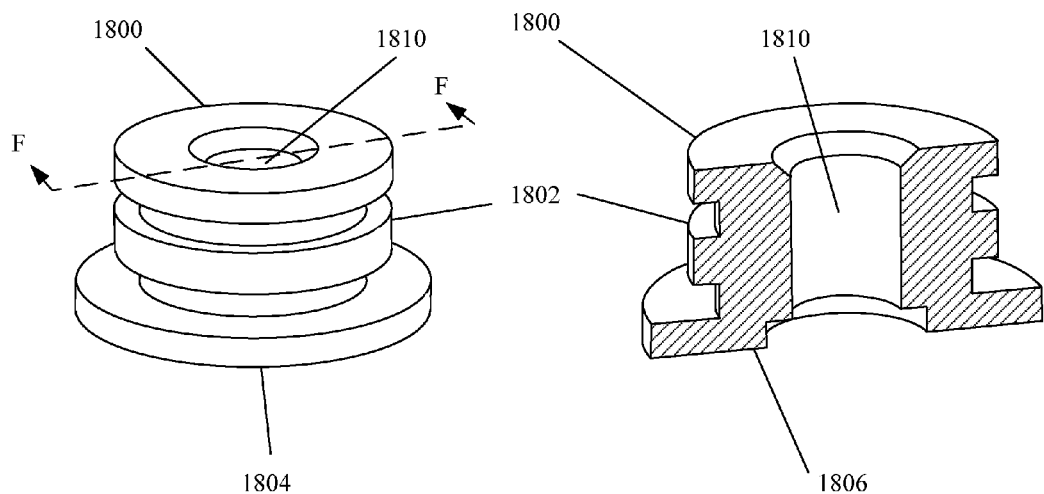
FIGS. 18A-18B are illustrations of a solderable threaded standoff, in accordance with one embodiment of the present disclosure.
Figure 18B:
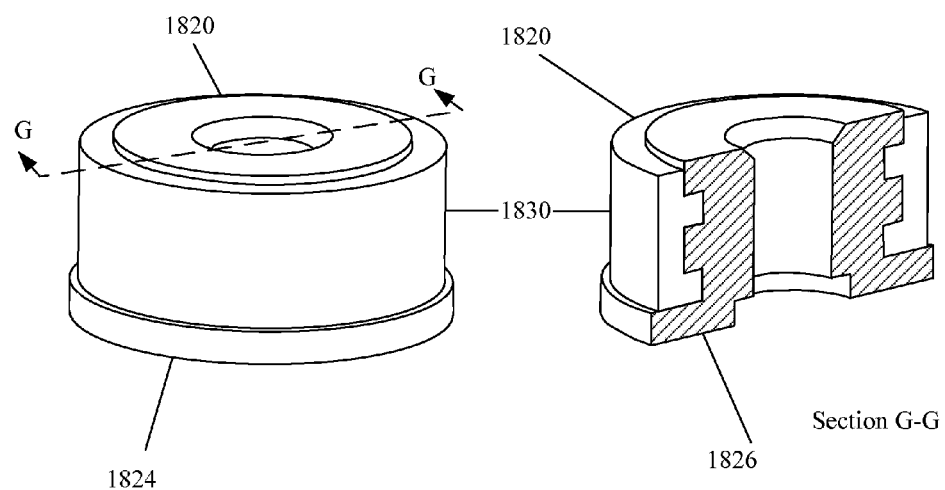

FIGS. 18A-18B are illustrations of a solderable threaded standoff, in accordance with one embodiment of the present disclosure. FIG. 18A shows metal core 1800 in both a full view 1804 and a cross-section view 1806. Metal core 1800 can be solder to a PCB with traditional soldering processes. Metal core 1800 can include interlock features 1802. Metal core 1800 can include a threaded hole 1810 that can be configured to receive a fastener, such as a screw.

FIG. 18B shows solderable threaded standoff 1820 in full view 1824 and in cross-section 1826. Solderable threaded standoff 1820 can include metal core 1800 and rubber outer sleeve 1830. Rubber outer sleeve 1830 can be pressed onto metal core 1800 and can engage interlock features 1802. Rubber outer sleeve 1830 can provide a compliant sleeve as well as provide a cosmetic cover for the metal core 1800. Material selected for rubber outer sleeve 1830 should be tolerant of typical soldering temperatures. Solderable threaded standoff 1820 can be soldered to a PCB and provide threaded anchor points for additional PCBs or other components. In one embodiment, metal core 1800 can extend at least 0.4 mm beyond rubber outer sleeve 1830 to ease the soldering process.

Figure 19A:
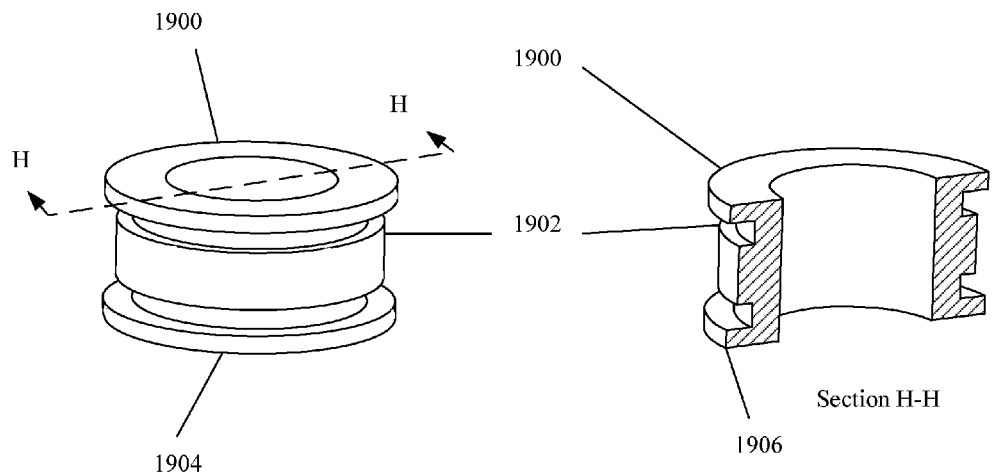
FIGS. 19A-19B are illustrations of another embodiment of a solderable standoff in accordance with one embodiment of the present disclosure.
Figure 19B:
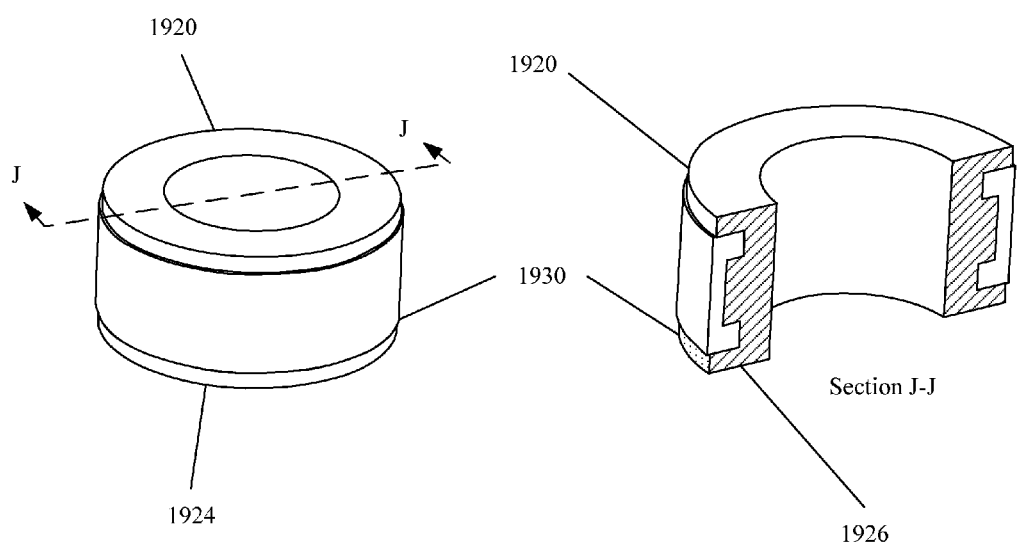

FIGS. 19A-19B are illustrations of another embodiment of a solderable standoff in accordance with one embodiment of the present disclosure. FIG. 19A shows metal core 1900 in both full view 1904 and cross-section view 1906. Metal core 1900 is symmetric with respect to top and bottom surfaces so that either or both surfaces can be soldered to a PCB. Metal core 1900 can include interlock features 1902. In one embodiment, metal core 1900 can include a threaded hole 1910 configured to receive a fastener. In other embodiments, hole 1910 can be smooth and without threads.

FIG. 19B shows solderable standoff 1920 in full view 1924 and in cross-section 1926. Solderable standoff 1920 can include metal core 1900 and rubber outer sleeve 1930. Rubber outer sleeve 1930 can be pressed onto metal core 1900 and can engage interlock features 1902. Rubber outer sleeve 1830 can provide a compliant sleeve as well as provide a cosmetic cover for the metal core 1900. Material selected for rubber outer sleeve 1930 should be tolerant of typical soldering temperatures. Solderable standoff 1920 can be soldered to a PCB and provide threaded anchor points for additional PCBs or other components. In one embodiment, metal core 1900 can extend at least 0.4 mm beyond rubber outer sleeve 1930 to ease the soldering process.

Figure 20A:
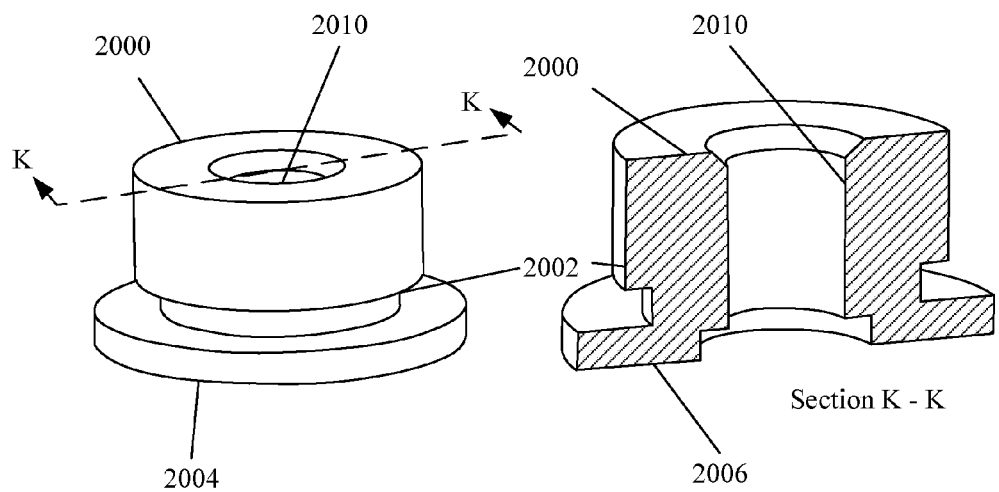
FIGS. 20A-20B are illustrations of yet another embodiment of a solderable standoff.
Figure 20B:
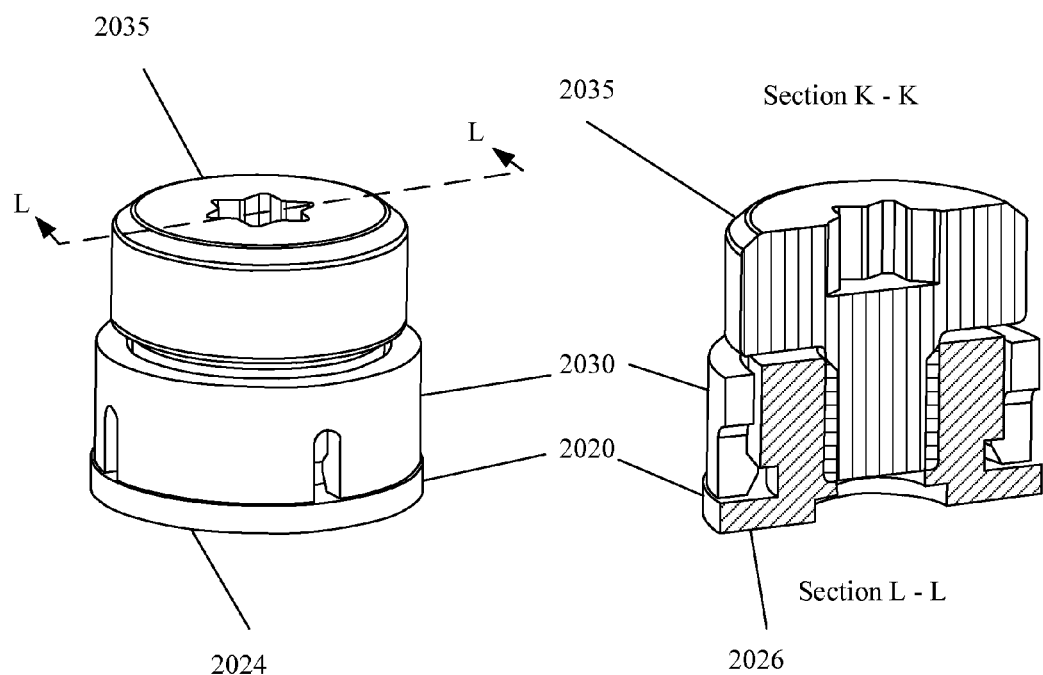

FIGS. 20A-20B are illustrations of yet another embodiment of a solderable standoff FIG. 20A shows metal core 2000 in full view 2004 and cross-section 2006. Metal core 2000 can include threaded hole 2010 disposed in the center of metal core 2000. Metal core can also include groove 2002. Metal core 2000 can be soldered to a substrate, such as PCB to provide a threaded anchoring point. FIG. 20B shows solderable standoff 2020 in full view 2024 and cross-section 2026. Plastic outer sleeve 2030 can be pressed over metal core 2000 after metal core 2000 has undergone the soldering process. Since plastic outer sleeve 2030 does not have to withstand relatively high temperatures related to soldering, material selection for plastic outer sleeve 2030 can be less restrictive compared to material selection for rubber cover described in FIGS. 17A-17B, FIGS. 18A-18B and FIGS. 19A-19B. FIG. 20B also shows fastener 2035 engaged in threaded hole 2010.

Portable computing device 100 can include internal components configured to wirelessly transfer data with wireless access points. One or more antennas are typically used to connect with the wireless access points. In one embodiment, one or more antennas can be concealed by cosmetic wall 404 near the region of clutch assembly 110.

Figure 21:
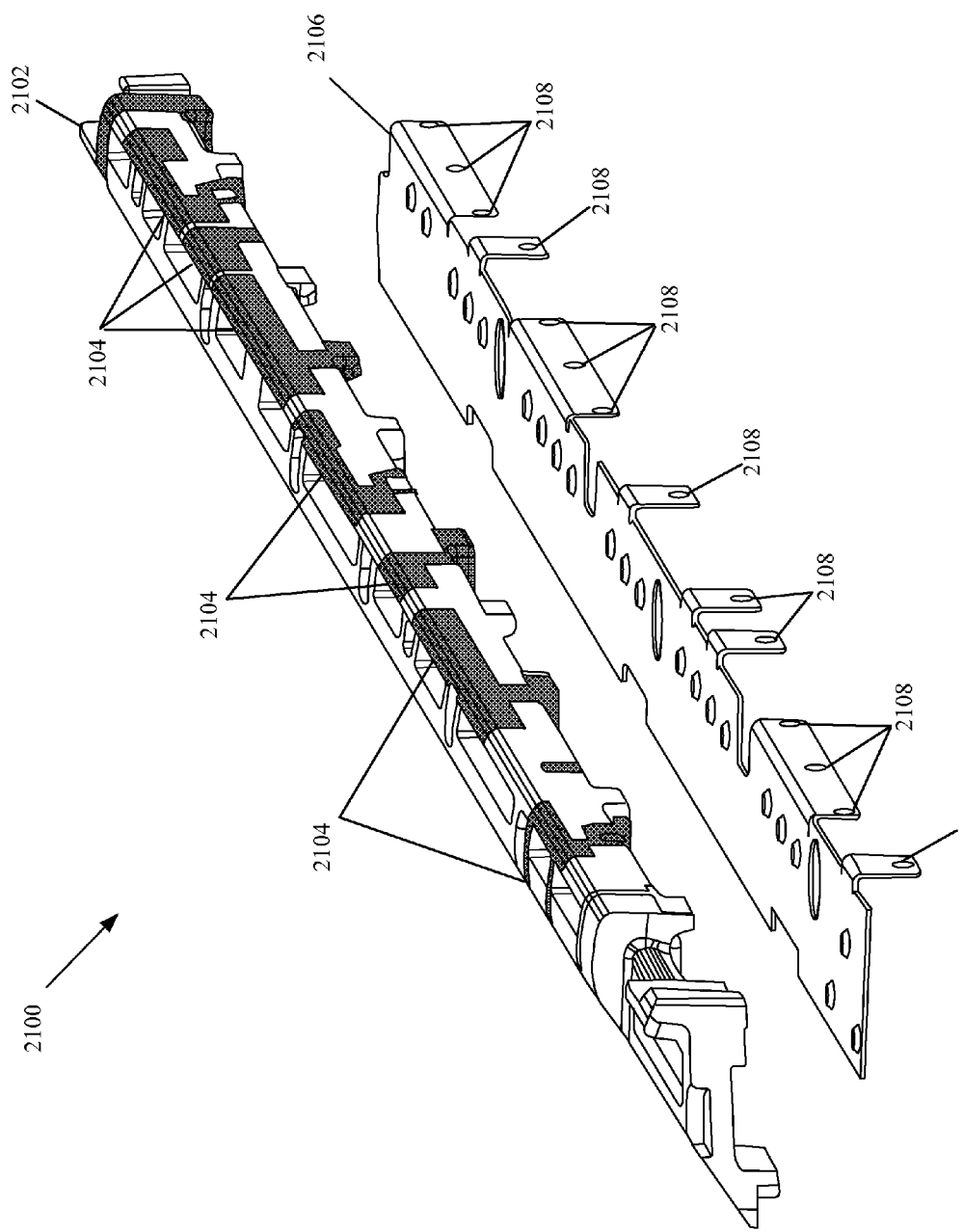
FIG. 21 illustrates an antenna assembly in accordance with one embodiment of the present disclosure.

FIG. 21 illustrates an antenna assembly 2100, in accordance with one embodiment of the present disclosure. The antenna assembly 2100 can include antenna array 2102 and shield 2106. Antenna array 2102 can be configured to support one or more antennas for communication with other wireless devices such as wireless access points or even other portable computing devices. Two or more antennas can be used to enhance wireless communications through diversity or multiple-input multiple-output (MIMO) technologies. Antenna array 2102 can include a support structure 2110 that can be formed from a polymer, plastic or any other technically feasible radio frequency transparent material. One or more antenna elements 2104 can be disposed on support structure 2110. Antenna elements 2104 can be driven elements, or non-driven elements such as directors or reflectors. In one embodiment, support structure 2110 can include a first antenna with a first radiation pattern and a second antenna with a second radiation pattern.

Shield 2106 can be coupled to antenna array 2102. Shield 2106 can be formed from a conductive material such as steel or aluminum, or can be formed from a non-conductive material made conductive with conductive coatings or paints. When shield 2106 is coupled to antenna array 2102, shield 2106 can act as a ground plane for antenna elements 2104. Shield 2106 can include one or more contact points 2108 that can be configured to engage with and make electrical contact with a conductive surface. In one embodiment, contact points 2108 can engage with rear cover 122 in lid portion 108 of portable computing device 100. When shield 2106 is coupled to ground through contact points 2108, shield 2106 can also be grounded and can act as an electromagnetic interference (EMI) shield that can reduce sensitivity of circuit element to EMI emissions. In one embodiment, when shield 2106 is grounded, shield 2106 can protect antenna array 2102 from EMI sources that can be nearby.

Figure 22:
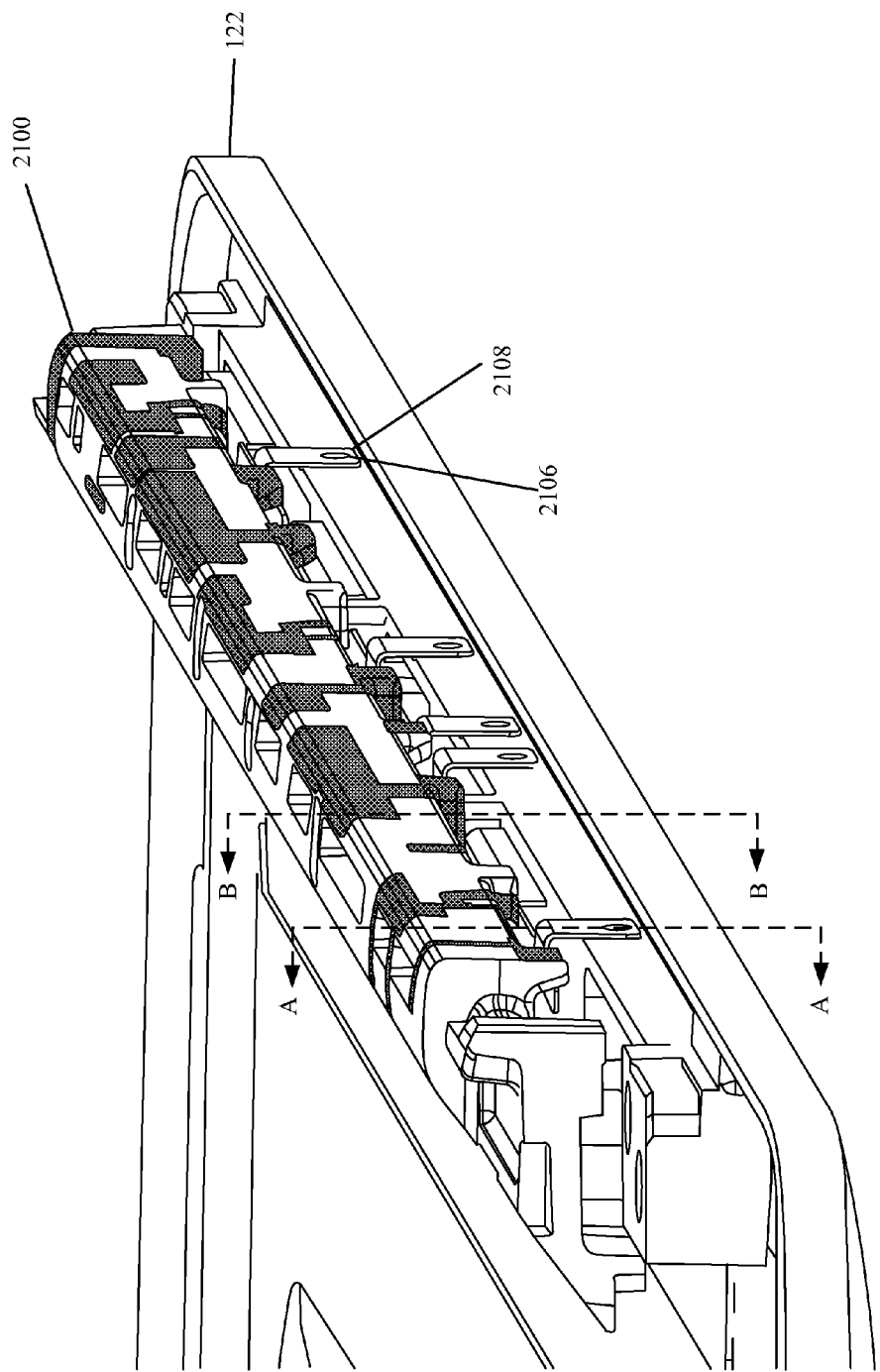
FIG. 22 shows antenna assembly coupled to the rear cover, in accordance with an embodiment of the present disclosure.
Figure 23A:
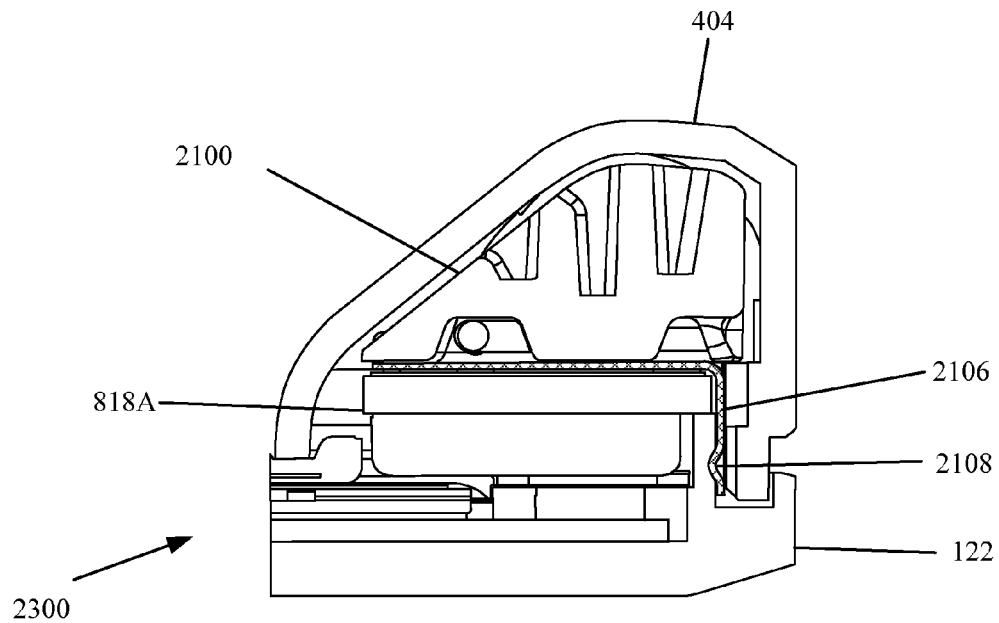
FIG. 23 shows sections of FIG. 22.

FIG. 22 shows antenna assembly coupled to rear cover 122, in accordance with an embodiment of the present disclosure. Rear cover 122 can be formed from a conductive material such as aluminum and can have a protective coating such as an anodization layer. Rear cover 122 can include an edge 2202 that can be configured to receive contact points 2108. In one embodiment, edge 2202 can have the protective coating removed prior to receiving contact points 2108. In one embodiment, contact points 2108 can be spaced by a predetermined amount. For example, contact points 2108 can be spaced apart by 12 mm, FIG. 23 shows section A-A (2300) from FIG. 22. Section A-A shows a relationship between shield 2106 and edge 2202 of antenna assembly 2100 in one region of rear cover 122. In this view, driver IC 1218A is shown in relation to rear cover 122 and antenna assembly 2100. Cosmetic wall 404 is also illustrated surrounding driver board 818A and antenna assembly 2100. Contact point 2108 is shown engaging with edge 2202 of rear cover 122. When rear cover 122 is grounded, then shield 2106 is coupled to ground as well.

Figure 23B:
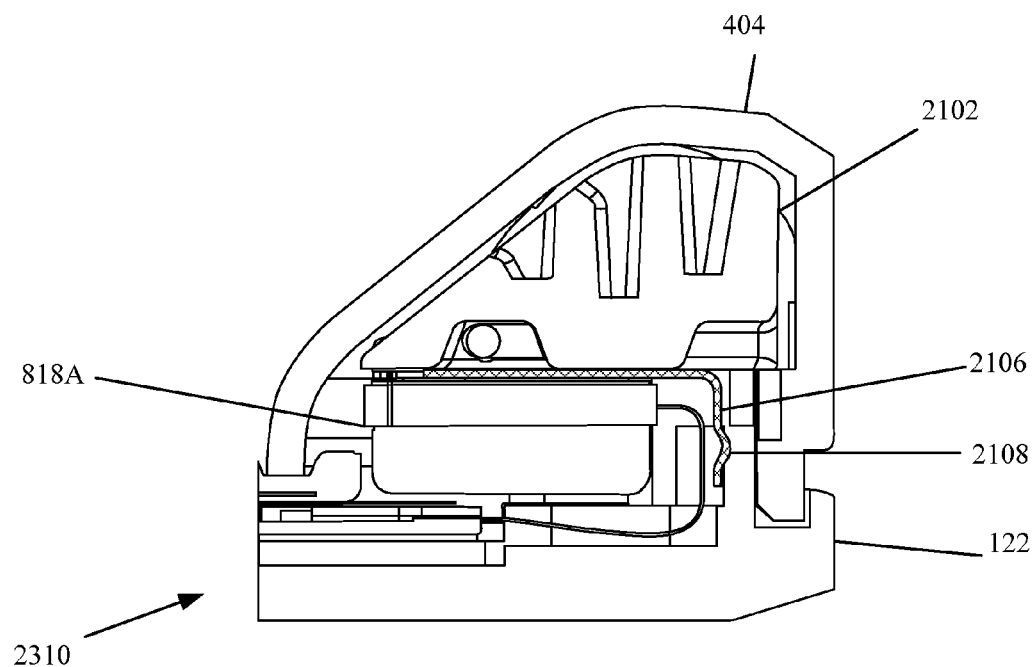

FIG. 23B shows section B-B (2310) from FIG. 22. Rear cover 122 and edge 2202 are shown in relation to contact point 2108 from shield 2106. This view particularly illustrates the contact point 2108 can engage a second surface of edge 2202. By engaging opposing surfaces of edge 2202, shield 2106 can be configured to at least partially mechanically attach to edge 2202.

Figure 24:
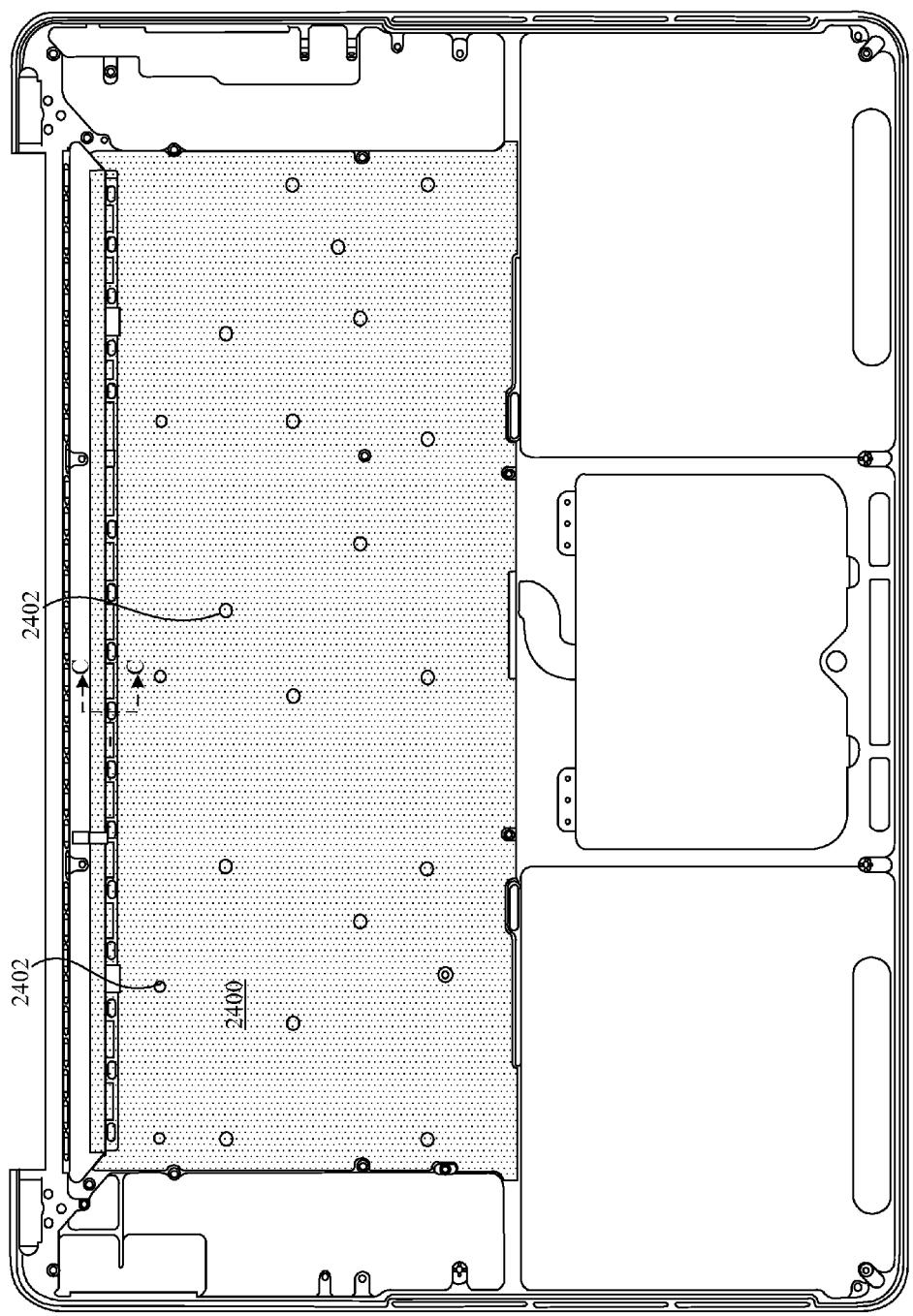
FIG. 24 illustrates one embodiment of a feature plate, in accordance with one embodiment of the present disclosure.

FIG. 24 illustrates feature plate 2400 used to support and enclose a keyboard module fastened to top case 106 by way of numerous fasteners 2402 such as screws, rivets, etc. Numerous advantages, however, can be realized by way of having a feature plate 2400 that is riveted to a top case 106 by way of multiple rivets 2402 to enclose various internal components therein. For example, the combination of the top case 106 and steel feature plate 2400 can result in the creation of an effective EMI shield (shown and described in more detail below) that can take the form of a Faraday cage type shield. This EMI shielding effect is enhanced by the use of numerous fastening points held together by rivets 2402, which tends to seal off the internal components of the keyboard better than when fewer fastening points are used, such as in a screw or bolt type arrangement. This EMI shield then effectively isolates the keyboard in an EMI sense from various other components in the computing device, such as the processor or any antenna that may be at the device.

As another benefit, using a rivet rather than other types of fastening components, such as screws, bolts and the like results in no need for the fastening component to extend through the top case 106. This is also advantageous in that manufacturing riveting processes can be significantly faster than similar screwing or bolting processes, in that the obverse side of the components being riveted does not need to be accessed in some cases, such as that which is disclosed above. Another benefit that can be realized by using rivets instead of screws is that the overall assembly can be thinner, particularly since there is no longer a need to accommodate threaded structures or components, which can take up space.

The use of rivets rather than screws can lead to simpler manufacturing processes that tend to save costs, are faster, and can also result in the use of more fastening points, which in turn leads to greater integrity in components that are fastened together more reliably. The overall feel of a riveted together top case, keyboard and feature plate assembly is also improved by using rivets rather than screws, as the combination of components tends to be stiffer, more stable, and more affixed together as an overall assembly.

Figure 25:
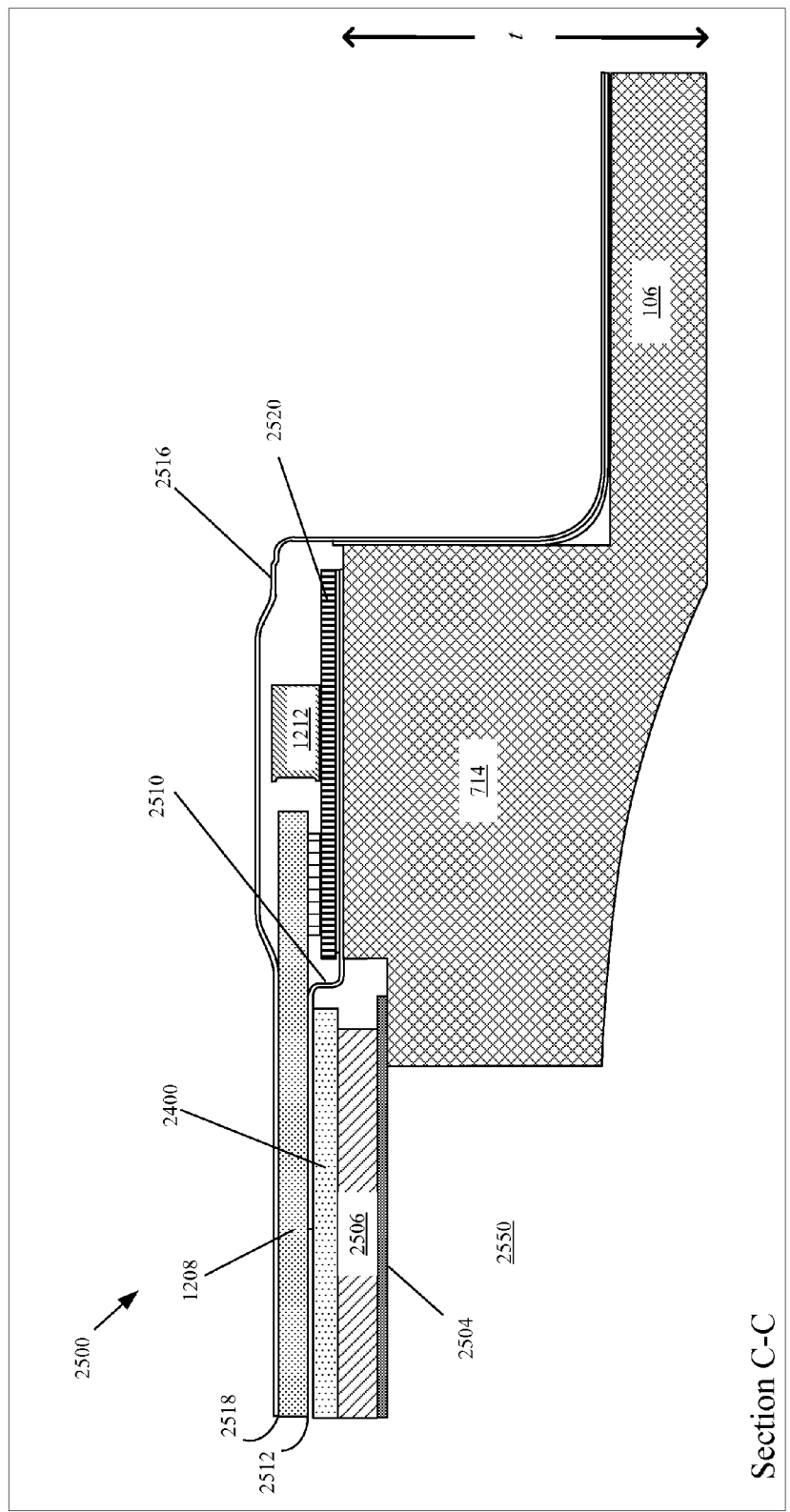
FIG. 25 shows a cross section of the feature plate.

Accordingly, FIG. 25 shows cross section C-C shown in FIG. 24 illustrating the relationship between keyboard support rib 714 and how it can provide a reference datum for both an EMI shield and light trap. Moreover, keyboard support rib 714 can have an enhanced thickness "t" in order to provide a substantially increased resistance to flexing or bending (that is proportional to $t^3$). Keyboard assembly 2500 can include a keycap (not shown) disposed within well 2550. Keyboard dome sheet 2504 can be used to translate a physical key press at keycap 118 to an electrical switching event that can be received at keyboard membrane 2506. Keyboard feature plate 2400 can be formed of a metal such as steel. In the described embodiment, keyboard feature plate 2400 can be used to support keyboard membrane 2506, keyboard dome sheet 2504, and mask 2510 in contact with first surface 2512 that masks light from LGP 1208 in accordance with pre-selected illuminated portions of keycap 118. Light from LGP 1208 is provided by a discrete light source such as an LED 1212. In one embodiment, LEDs 1212 can In order to maximize the amount of light provided to keycap 118 at first surface 2512, reflector layer 2516 can be disposed on second surface 2518 of LGP 1208. Reflector layer 2516 can be a metallic foil that in combination with keyboard feature plate 2400 can form an enclosure that is well suited for trapping excess light from LED 1212 as well any EMI generated by keyboard membrane 1006. As shown, keyboard support rib 714 can act as a reference datum for reflector layer 2516. In this way, feature plate 2400 and reflector layer 1016 together can completely seal LGP 1208 to prevent excess light and EM radiation from escaping. LED 1212 can be disposed on driver board 2520 and can emit light substantially parallel to the driver board 2520. In one embodiment, LEDs 1212 can emit light into one edge of the LGP 1208. Driver board 2520 can be a printed circuit board, a flexible circuit board, a rigid flex board, or any other feasible substrate. Driver board 2520 can provide a substrate to mount LEDs 1212 and can route power to the LEDs 2505. In some embodiments, light guide panel 1208 can be configured to adjust light distribution to more evenly distribute light. Generally elements such as key caps closer to light sources can appear brighter than elements further away from light sources. To address this shortcoming, the LGP 1208 can be configured to adjust an amount of light appearing at each key cap. In one embodiment, LGP 1208 can be made less efficient at predetermined locations.

Figure 26:
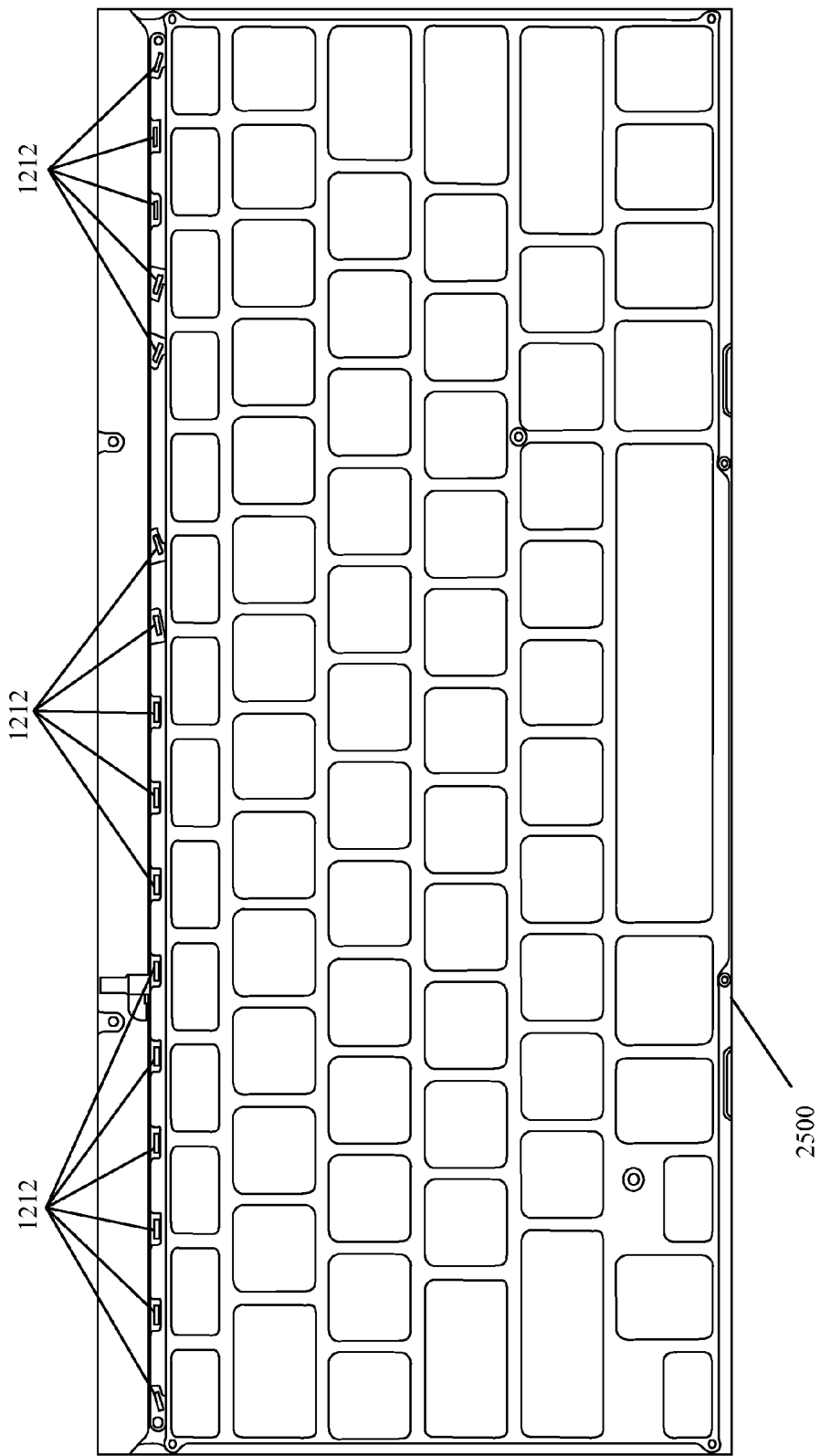
FIG. 26 is another view of keyboard assembly.

FIG. 26 is another view of keyboard assembly 2500. This view highlights LED 1212 placement along one edge of keyboard assembly 2500. In one embodiment, arranging LEDs 1212 along one edge of the assembly 2500 can provide a more uniform light distribution into LGP 1208 which can produce a more uniform distribution of light to key caps 118. Furthermore, since light from LEDs 1212 is propagated along a relatively shorter axis of keyboard assembly 2500, light losses related to distance is reduced. LED 1212 placement along one edge also can reduce self shadowing effects caused by an LED placed with the field.

Figure 27A:
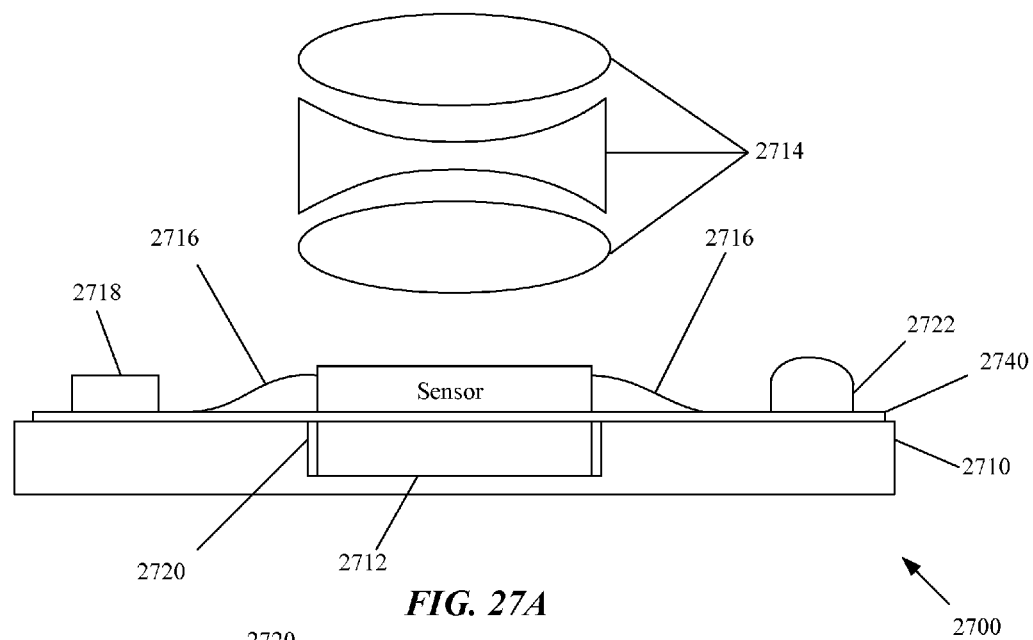
FIGS. 27A and 27B are of a camera assembly.
Figure 27B:
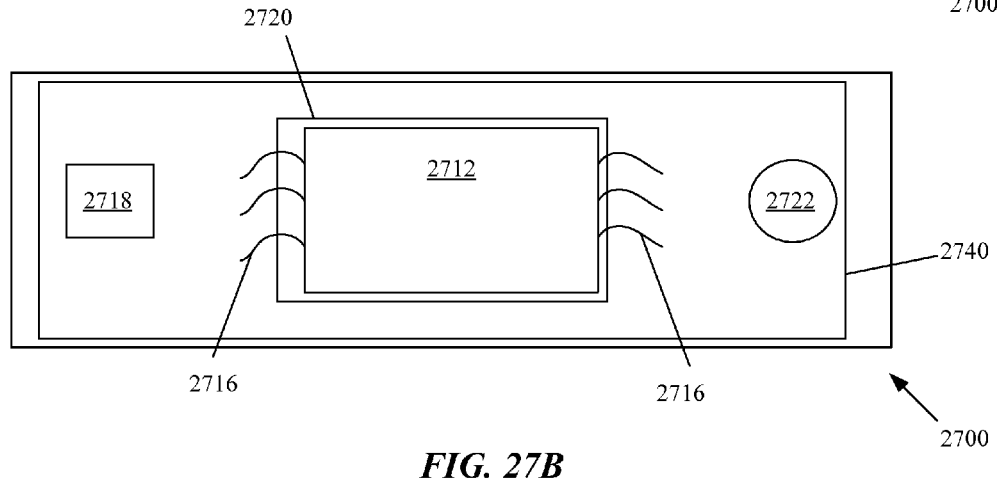

FIGS. 27A and B are views of a camera assembly 2700. Camera assembly can be a portion of image capture device 126 shown in FIG. 1. FIG. 27A shows a side view of camera assembly 2700 can include stiffener 2710, image sensor 2712 and one or more lenses 2714. Stiffener 2710 can be relatively thin yet rigid to support and protect image sensor 2712. In one embodiment, stiffener 2710 can be a metal, such as aluminum; however, other material can be used such as reinforced plastics, fiberglass or other materials with similar material properties. As shown, stiffener 2710 can provide a mounting surface for image sensor 2712 while also protecting at least one side of image sensor 2712 from external forces, such as pressure. Additionally, sensor 2712 can be stiffened in accordance with the stiffness of stiffener 2710. Stiffener 2710 can also include a pocket 2720 that can accept image sensor 2712. In one embodiment image sensor 2712 can be affixed to stiffener 2710 with an adhesive such as glue or a pressure sensitive adhesive. A circuit board 2740 can be disposed on stiffener 2710. In one embodiment, circuit board 2740 can be a flexible circuit board. In other embodiments, circuit board 2740 can be a rigid-flex board, a rigid board, or any other technically feasible substrate. Circuit board 2740 can also support light sensor 2718 that can detect environmental (local, and/or ambient) light levels with which can be used to control display brightness. Circuit board 2740 can also support LED 2712. LED 2712 can be used to indicate image sensor operation or status. Bond wires 2716 can couple signals from image sensor 2712 through circuit board 2740 to circuits for processing data from image sensor. In one embodiment, bond wires 2716 can couple image sensor data to a processing circuit that can receive these signals and encode the image data as USB data. FIG. 27B shows a top view of one embodiment of camera assembly 2700.

Figure 28:
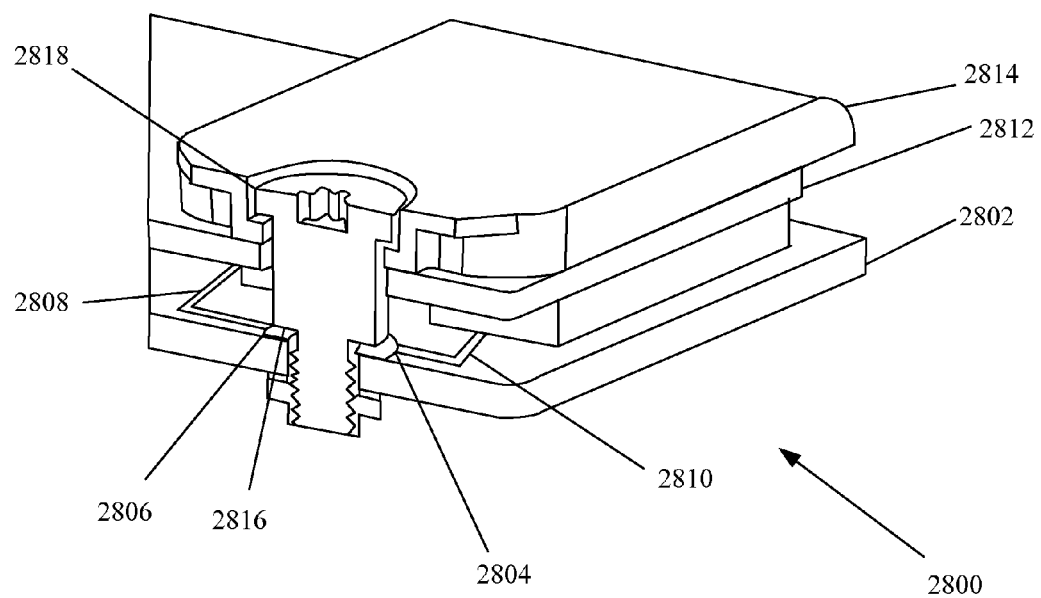
FIG. 28 is an illustration of an electro-mechanical interlock assembly, in accordance with one embodiment of the present disclosure.

FIG. 28 is an illustration of an electro-mechanical interlock assembly 2800, in accordance with one embodiment of the present disclosure. The electro-mechanical interlock (hereinafter referred to as the interlock) can advantageously couple two or more PCBs within portable computing device 100 while contemporaneously controlling current flow in an electric circuit. The interlock assembly 2800 includes a first PCB 2812 and a second PCB 2802. Second PCB can include a first conductor 2806 and a second conductor 2804 separated by a gap (not shown in figure). Interlock assembly 2800 can also include a locking bracket 2814 and fastener 2818.

When fastener 2818 is used to couple first PCB 2812 to second PCB 2802, flat surface 2816 of fastener 2818 can contact and electrically couple first conductor 2806 to second conductor 2804. In one embodiment, first conductor 2806 and second conductor 2804 can be PCB land patterns corresponding to flat surface 2816. First conductor 2806 and second conductor 2804 can be copper, tinned copper, or any other technically feasible conductive material. In one embodiment a battery voltage can be coupled to first conductor 2806 through circuit 2808. In this embodiment, fastener 2818 can act as a battery disconnect switch and prevent mechanical or cosmetic damage that can occur when otherwise disconnecting the battery.

Figure 29:
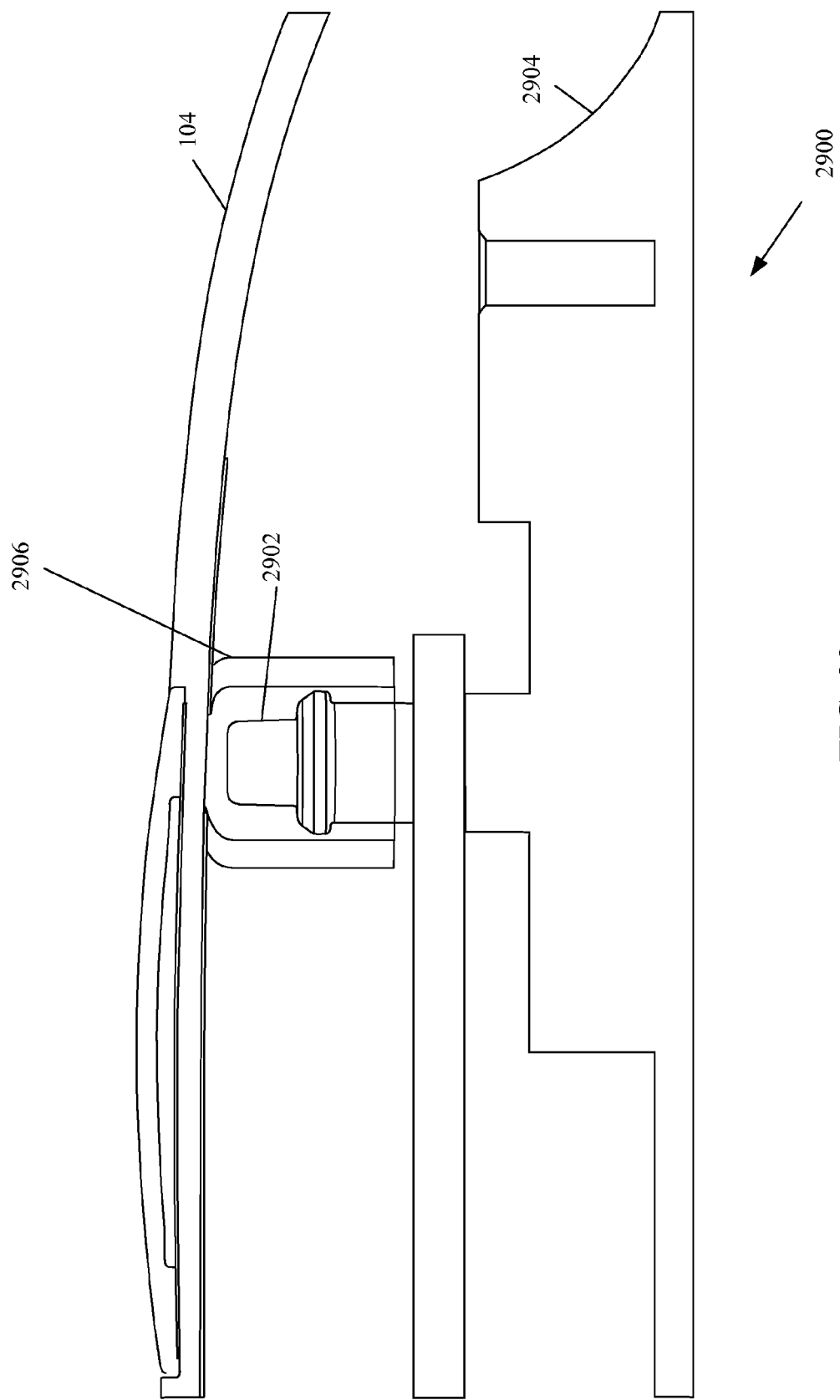
FIG. 29 is an illustration of one embodiment of a conductive elastomer in accordance with one embodiment of the present disclosure.

FIG. 29 is an illustration 2900 of one embodiment of a conductive elastomer in accordance with one embodiment of the present disclosure. In one embodiment, the conductive elastomer can be formed from a silver loaded silicone. In another embodiment, the conductive elastomer can be formed from styrene, nitrile, neoprene or other compliant material that can be made conductive with an addition silver, copper, aluminum or any other technically feasible material. The selected materials forming the conductive elastomer provide a solid yet compliant elastomer that can deform at least partially when compressed.

Portable computing device 100 can include many sources of electrical noise that, if unconstrained, can cause undue interference to neighboring electrical devices. In the exemplary embodiment of FIG. 29, a heat pipe 758 can have received EMI radiation from sources within the portable computing device 100. Fastener 2902 can be used to mechanically anchor heat pipe 758 to a fixture 2904 that can in turn be coupled to top case 106 (not shown). In one embodiment, conductive elastomer 2906 can be affixed to fastener 2902. Fastener 2902 can also receive an electrically conductive finish such as bright nickel, chrome or the like. When bottom case 104 is affixed to top case 106, bottom case 104 can come into contact with conductive elastomer 2906 and provide a ground signal pathway from bottom case 104 through conductive elastomer 2906 to heat pipe 758. The ground signal pathway can help attenuate EMI signals that may be present on heat pipe 758, especially when bottom case 104 is coupled to a low impedance ground source. In one embodiment, a ground signal pathway can be enhanced by placing a fastener including the conductive elastomer in the region requiring ground signal pathway improvement.

In one embodiment conductive elastomer 2906 can be configured to be a dome shape. In this embodiment, conductive elastomer 2906 can cosmetically enhance internal components of portable computing device 100. In another embodiment, conductive elastomer 2906 can be configured to be a cylindrical shape. In this embodiment, access to screw 2902 is provided even when conductive elastomer 2906 is in place on screw 2902, enhancing serviceability of some internal components.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A portable computing device, comprising:
   a base portion including a top case and bottom case, the top case comprising:
      a printed circuit assembly disposed in the top case, comprising:
         a heat pipe configured to convey heat from a first portion to a second portion;
         a fastener configured to couple a first region of the heat pipe to the top case; and
         a conductive elastomer, configured to attach to the fastener and provide an electrical pathway from the fastener to the bottom case.

2. The portable computing device of claim 1 wherein the bottom case comprises a conductive area in a region near the conductive elastomer when the bottom case is affixed to the top case, wherein the conductive elastomer is configured to allow access to at least one portion of the fastener.

3. The portable computing device as recited in claim 1, further comprising:
   an integrated support system integrally formed with the top case, the integrated support system configured to distribute an externally applied load through the base portion and provide structural elements for attaching selected operational components to the top case.

4. The portable computing device as recited in claim 3, the integrated support system comprising a keyboard support rib that surrounds an opening in a keyboard zone in the top case, the keyboard support rib configured to support a keyboard assembly disposed in the opening.

5. The portable computing device as recited in claim 4, the keyboard assembly comprising:
   a plurality of keypads;
   a light guide panel configured to receive light from a light source at least some of which passes through a first surface of the light guide panel to directly illuminate selected portions of the plurality of keycaps;
   a reflector layer disposed at a second surface of the light guide panel, the second surface opposite the first surface, the reflector layer configured to reflect light incident at the second surface to the first surface thereby enhancing an amount of light used to illuminate the plurality of key caps; and
   a feature plate secured to the top case and configured to support the keyboard assembly.

6. The portable computing device as recited in claim 5, the keyboard support rib comprising:
   a first horizontal surface configured to secure a perimeter portion of the feature plate; and
   a second horizontal surface configured to secure the reflector layer, the second horizontal surface forming a reference datum for the reflector layer.

7. The portable computing device as recited in claim 6, the keyboard support rib forming part of an EMI shield in the form of a Faraday cage that prevents leakage of EM radiation from the keyboard assembly and forming part of a light trap that prevents leakage of light from the light guide panel.

8. The portable computing device as recited in claim 3, further comprising:
an antenna array comprising:
a support structure configured to be radio frequency transparent, connected to the integrated support system, and
a first antenna element disposed on the support structure, and a metal shield coupled to the antenna array configured to function as a ground plane for the first antenna element, the metal shield comprising a first contact point configured to engage a grounded surface, wherein the antenna array further comprises a second antenna element disposed on the support structure.

9. The portable computing device as recited in claim 8, the metal shield further comprising:
a second contact point configured to engage the grounded surface and wherein the first and second contact points are configured to engage the grounded surface from opposing directions.

10. The portable computing device as recited in claim 3, the top case further comprising:
a touch pad support, the touch pad support integrally formed with the integrated support system.

11. The portable computing device as recited in claim 10, the touch pad support comprising one or more shoulders configured to secure a touch pad assembly, the touch pad assembly comprising a touch pad cover that defines an outer surface of the touch pad assembly configured for receiving touch events thereon, the touch pad cover extending from a first end of the touch pad assembly to a second end of the touch pad assembly.

12. The portable computing device as recited in claim 11, the touch pad assembly secured to the integrated support structure at the at least two shoulders using a fastener such that a load applied at the touch pad is transferred to the integrated support system that, in turn, distributes the load through the base portion.

13. The portable computing device as recited in claim 12, the touch pad assembly further comprising:
a touch sensor disposed beneath the cover configured to detect the received touch events and generate a touch signal; and
a printed circuit board comprising one or more touch circuits and connectors, the printed circuit board configured to receive the touch signal, the printed circuit board in communication with the touch sensor and coupled to the second end of the cover.

14. The portable computing device as recited in claim 13, the printed circuit board further comprising a structural element, the structural element configured to support the second end of the cover and configured to provide structural support for the touch pad assembly, the structural element in contact with the touch pad support.

15. The portable computing device as recited in claim 14, the structural element comprising a stiffener, the stiffener having one or more protrusions that extend past the second end of the cover.

16. The portable computing device as recited in claim 15, the touch pad assembly further comprising:
a backing plate positioned below the touch pad configured to define a planar surface that forms a portion of a compartment in which a mass storage device is positioned, the compartment comprising a plurality of ribs integrally formed with the integrated support system.

17. The portable computing device as recited in claim 16, the mass storage device comprising a first major surface, a second major surface, and a plurality of edge surfaces defining a plurality of corners, a first elastomeric material, and a second elastomeric material with the first elastomeric material positioned between the first major surface of the mass storage device and with a major wall of a compartment and the second elastomeric material positioned between the corners of the mass storage device and the side walls of the compartment.

18. The portable computing device as recited in claim 3, further comprising:
a printed circuit board;
a display driver mounted to the printed circuit board and in communication therewith; and
a light emitting diode mounted to the printed circuit board and in communication therewith.

19. The portable computing device as recited in claim 18, further comprising a light guide panel and a display panel, wherein the printed circuit board is at least partially positioned between the light guide panel and the display panel.

20. The portable computing device as recited in claim 1, further comprising:
an image sensor assembly comprising:
a first lens configured to process incoming visual signals;
an image sensor configured to receive the processed incoming visual signals; and
a support stiffener comprising a well, the well configured to accept the image sensor, wherein the image sensor is affixed to the support stiffener.

21. The portable computing device as recited in claim 20, wherein the image sensor assembly further comprises a first bond wire configured to couple a first signal from the image sensor to an external electrical component.

22. The portable computing device as recited in claim 21, wherein the image sensor assembly further comprises a light emitting diode configured to indicate image sensor activity.

23. The portable computing device as recited in claim 22, wherein the image sensor assembly further comprises a light sensor configured to detect ambient light levels.

* * * * *

UNITED STATES PATENT AND TRADEMARK OFFICE
CERTIFICATE OF CORRECTION

PATENT NO. : 8,897,002 B2  
APPLICATION NO. : 13/492789  
DATED : November 25, 2014  
INVENTOR(S) : Brett W. Degner et al.

Page 1 of 1

It is certified that error appears in the above-identified patent and that said Letters Patent is hereby corrected as shown below:

In the Claims:

Column 18, line 47 (Claim 5, line 7): "plurality of keycaps;" should read --plurality of keypads;--.

Column 18, line 53 (Claim 5, line 13): "plurality of key caps;" should read --plurality of keypads;--.

Column 19, line 33 (Claim 12, line 3): "structure at the at least two shoulders" should read --system at the one or more shoulders--.

Column 19, line 34 (Claim 12, line 4): "touch pad is" should read --touch pad assembly is--.

Column 20, line 20 (Claim 17, line 9): "and the side walls" should read --and side walls--.

Signed and Sealed this  
Twenty-first Day of April, 2015

Michelle K. Lee  
*Director of the United States Patent and Trademark Office*